United States Patent
Cai et al.

(10) Patent No.: US 12,052,591 B2
(45) Date of Patent: Jul. 30, 2024

(54) MONITORING METHOD AND DEVICE

(71) Applicant: Huawei Technologies Co., Ltd., Shenzhen (CN)

(72) Inventors: Yu Cai, Beijing (CN); Haibo Xu, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 619 days.

(21) Appl. No.: 17/266,040

(22) PCT Filed: Aug. 30, 2019

(86) PCT No.: PCT/CN2019/103506
§ 371 (c)(1),
(2) Date: Feb. 4, 2021

(87) PCT Pub. No.: WO2020/043180
PCT Pub. Date: Mar. 5, 2020

(65) Prior Publication Data
US 2022/0361013 A1     Nov. 10, 2022

(30) Foreign Application Priority Data
Aug. 31, 2018 (CN) .......................... 201811011912.3

(51) Int. Cl.
*H04W 24/08* (2009.01)
*H04W 72/1273* (2023.01)
*H04W 74/0833* (2024.01)

(52) U.S. Cl.
CPC ....... *H04W 24/08* (2013.01); *H04W 72/1273* (2013.01); *H04W 74/0833* (2013.01)

(58) Field of Classification Search
CPC ............. H04W 24/08; H04W 72/1273; H04W 74/0833
See application file for complete search history.

(56) References Cited

U.S. PATENT DOCUMENTS

2012/0275364 A1   11/2012   Anderson et al.
2013/0194956 A1*   8/2013   Sartori .................. H04W 24/02
                                     370/252

(Continued)

FOREIGN PATENT DOCUMENTS

CN   102934383 A   2/2013
CN   103442444 A   12/2013
(Continued)

OTHER PUBLICATIONS

LG Electronics Inc., "Remaining issues for PO," 3GPP TSG-RAN WG2#103, Gothenburg, Sweden, R2-1811751, total 4 pages, 3rd Generation Partnership Project, Valbonne, France (Aug. 20-24, 2018).

(Continued)

*Primary Examiner* — Duc C Ho
(74) *Attorney, Agent, or Firm* — Leydig, Voit & Mayer, Ltd.

(57) ABSTRACT

A method for monitoring a communications channel between a terminal device and a network device is described. The method includes: obtaining a first search space configuration and a second search space configuration. The first search space configuration includes a first search space set and the second search space configuration includes a second search space set, or the first search space configuration includes a first search space parameter and the second search space configuration includes a second search space parameter. The method further includes monitoring a physical downlink control channel (PDCCH) based on the first search space configuration if a first condition is met. The first condition includes: a first timer is not in a running state; or monitoring, by the terminal device, a PDCCH based on the second search space configuration if a second condition is (Continued)

met. The second condition includes a first timer is in a running state.

16 Claims, 10 Drawing Sheets

(56) References Cited

U.S. PATENT DOCUMENTS

| | | | |
|---|---|---|---|
| 2016/0360515 | A1* | 12/2016 | Moulsley .......... H04W 72/0446 |
| 2017/0289899 | A1 | 10/2017 | You et al. |
| 2017/0318566 | A1 | 11/2017 | Deogun et al. |

FOREIGN PATENT DOCUMENTS

| | | | |
|---|---|---|---|
| CN | 103491516 | A | 1/2014 |
| CN | 103716144 | A | 4/2014 |
| CN | 103907325 | A | 7/2014 |
| CN | 106162919 | A | 11/2016 |
| CN | 108365928 | A | 8/2018 |
| CN | 108632960 | A | 10/2018 |
| CN | 110731112 | A | 1/2020 |
| CN | 112352458 | A | 2/2021 |
| EP | 3793285 | A1 | 3/2021 |
| IN | 107852310 | A | 3/2018 |
| JP | 2015524181 | A | 8/2015 |
| JP | 2016535466 | A | 11/2016 |
| WO | 2016204161 | A1 | 12/2016 |
| WO | 2018035816 | A1 | 3/2018 |
| WO | 2018127802 | A1 | 7/2018 |

OTHER PUBLICATIONS

Qualcomm Incorporated, "Advanced Grant Indication for UE Power Saving," 3GPP TSG RAN WG1 #91, Reno, NV, USA, R1-1720709, total 5 pages, 3rd Generation Partnership Project, Valbonne, France (Nov. 27-Dec. 1, 2017).

Huawei, HiSilicon, "Signaling based mechanisms for UE power saving," 3GPP TSG RAN WG1 Meeting #94bis, Chengdu, China, R1-1810155, total 7 pages, 3rd Generation Partnership Project, Valbonne, France (Oct. 8-12, 2018).

"Offline summary for PDCCH structure and search space," 3GPP TSG RAN WG1 Meeting #94, Gothenburg, Sweden, R1-1809855, Total 70 pages, 3rd Generation Partnership Project, Valbonne, France (Aug. 20-24, 2018).

"Remaining issues on control resource set and search space," 3GPP TSG RAN WG1 Meeting #93, R1-1807353, Busan, Korea, pp. 1-11, 3rd Generation Partnership Project, Valbonne, France (May 21-25, 2018).

"3rd Generation Partnership Project; Technical Specification Group Radio Access Network; NR; Medium Access Control (MAC) protocol specification (Release 15)," 3GPP TS 38.321 V15.2.0, pp. 1-73, 3rd Generation Partnership Project, Valbonne, France (Jun. 2018).

"3rd Generation Partnership Project; Technical Specification Group Radio Access Network; NR; Physical layer procedures for control (Release 15)," 3GPP TS 38.213 V15.2.0, pp. 1-99, 3rd Generation Partnership Project, Valbonne, France (Jun. 2018).

"Remaining issues on bandwidth part and CA," 3GPP TSG RAN WG1 Meeting #94, R1-1809752, Gothenburg, Sweden, Total 24 pages, 3rd Generation Partnership Project, Valbonne, France (Aug. 20-24, 2018).

"PDCCH monitoring and duplex mode operation," 3GPP TSG-RAN WG2#103, Tdoc R2-1811611, Revision of R2-1810059, Gothenburg, Sweden, pp. 1-4, 3rd Generation Partnership Project, Valbonne, France (Aug. 20-24, 2018).

"3rd Generation Partnership Project; Technical Specification Group Radio Access Network; NR; Radio Resource Control (RRC) protocol specification (Release 15)," 3GPP TS 38.331 V15.2.1, pp. 1-303, 3rd Generation Partnership Project, Valbonne, France (Jun. 2018).

"On DL signals and channels for NR-U," 3GPP TSG-RAN WG1 Meeting #93, Tdoc R1-1806251, Busan, Korea, pp. 1-4, 3rd Generation Partnership Project, Valbonne, France (May 21-25, 2018).

"General considerations on UE power saving in Rel-16," 3GPP TSG RAN WG1 Meeting #94, R1-1809333, Gothenburg, Sweden, Total 5 pages, 3rd Generation Partnership Project, Valbonne, France (Aug. 20-24, 2018).

* cited by examiner

MONITORING METHOD AND DEVICE

CROSS-REFERENCE TO RELATED APPLICATIONS

This application is a national stage of International Application No. PCT/CN2019/103506, filed Aug. 30, 2019, which claims priority to Chinese Patent Application No. 201811011912.3, filed on Aug. 31, 2018. Both of the aforementioned applications are hereby incorporated by reference in their entireties.

TECHNICAL FIELD

Embodiments of this disclosure relate to the communications field, and in particular, to a method and a device for monitoring a PDCCH in a process of communication between a terminal device and a network device.

BACKGROUND

When user equipment (UE) is in a radio resource control (RRC) connected mode, to reduce power consumption of the UE, a discontinuous reception (DRX) function may be configured for the UE. After DRX is configured, the UE may monitor a physical downlink control channel (PDCCH) within only some time periods, and does not monitor a PDCCH within the other time periods, to reduce power consumption of the UE.

Specifically, the UE communicates with a base station in a configured bandwidth part (BWP), and a configuration parameter of the downlink BWP includes search space configured for the UE. The UE monitors a PDCCH within a time period in a DRX cycle in all pieces of search space configured for the UE. For example, a maximum of 10 pieces of search space are configured for the UE when the UE performs communication in the currently configured BWP. The UE needs to monitor a PDCCH in the 10 pieces of search space within the time period in the DRX cycle. In this case, power consumption cannot be ignored.

SUMMARY

Embodiments of this application provide a monitoring method and a device, to reduce power consumption caused by PDCCH monitoring performed by a terminal device in a process of communicating with a network device.

To achieve the foregoing objective, the following technical solutions are used in the embodiments of this application.

According to a first aspect, a monitoring method is disclosed, including: first obtaining, by a terminal device, a first search space configuration and a second search space configuration, where the first search space configuration includes a first search space set, the second search space configuration includes a second search space set, and the first search space set is different from the second search space set, or the first search space configuration includes a first search space parameter, the second search space configuration includes a second search space parameter, and the first search space parameter is different from the second search space parameter; and monitoring, by the terminal device, a PDCCH based on the first search space configuration if a first condition is met, where the first condition includes: a first timer is not in a running state; or monitoring, by the terminal device, a PDCCH based on the second search space configuration if a second condition is met, where the second condition includes: a first timer is in a running state.

According to the monitoring method provided in this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the first aspect, in a first possible implementation of the first aspect, the method further includes: starting or restarting the first timer if the terminal device receives a PDCCH; starting or restarting the first timer if the terminal device receives a PDCCH used to indicate data transmission; starting or restarting the first timer if the terminal device receives a PDCCH used to indicate new transmission; or starting or restarting, by the terminal device, the first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer. Further, the terminal device may make a corresponding decision based on whether the first timer is run, and monitor the PDCCH by using the first search space configuration, or monitor the PDCCH by using the second search space configuration.

With reference to the first aspect or the first possible implementation of the first aspect, in a second possible implementation of the first aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the first aspect or the first or second possible implementation of the first aspect, in a third possible implementation of the first aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the first aspect or the first to the third possible implementations of the first aspect, in a fourth possible implementation of the first aspect, the obtaining, by a terminal device, a first search space configuration and a second search space configuration includes: receiving, by the terminal device, first information sent by a network device, where the first information includes or indicates the first search space configuration; and receiving, by the terminal device, second information sent by the network device, where the second information includes or indicates the second search space configuration.

This embodiment of the disclosure further provides a possible implementation in which the terminal device obtains the first search space configuration and the second search space configuration. The terminal device may receive the first information sent by the network device to obtain the first search space configuration, and receive the second information sent by the network device to obtain the second search space configuration.

With reference to any one of the first aspect or the first to the fourth possible implementations of the first aspect, in a fifth possible implementation of the first aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the first aspect or the first to the fourth possible implementations of the first aspect, in a fifth possible implementation of the first aspect, if the first condition is met, a multiple-input multiple-output MIMO layer quantity to be used by the terminal device to receive a physical downlink shared channel PDSCH indicated by the PDCCH is a first MIMO layer quantity, or if the second condition is met, a MIMO layer quantity to be used by the terminal device to receive a PDSCH indicated by the PDCCH is a second MIMO layer quantity; and the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

With reference to any one of the first aspect or the first to the fifth possible implementations of the first aspect, in a sixth possible implementation of the first aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the first aspect or the first to the sixth possible implementations of the first aspect, in a seventh possible implementation of the first aspect, the method further includes: monitoring, by the terminal device, the PDCCH based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a second aspect, a monitoring method is disclosed, including: first obtaining, by a terminal device, a first search space configuration and a second search space configuration, where the first search space configuration includes a first search space set, the second search space configuration includes a second search space set, and the first search space set is different from the second search space set, or the first search space configuration includes a first search space parameter, the second search space configuration includes a second search space parameter, and the first search space parameter is different from the second search space parameter; and monitoring, by the terminal device, a PDCCH based on the first search space configuration if a first condition is met; or monitoring a PDCCH based on the second search space configuration if a second condition is met, where the first condition includes that the terminal device is between a first moment and a second moment, and the second condition includes that the terminal device is after the second moment. It should be noted that, the first moment may be a start moment of discontinuous reception DRX on duration. The second moment is a moment at which the terminal device receives the $N^{th}$ PDCCH after the first moment. Alternatively, the second moment is a moment later than a third moment by first duration, and the third moment may be a moment at which the terminal device receives the $N^{th}$ PDCCH after the first moment. N is an integer greater than or equal to 1, and a length of the first duration is greater than 0.

According to the monitoring method provided in this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the second aspect, in a first possible implementation of the second aspect, the method further includes: starting or restarting the first timer if the terminal device receives a PDCCH; starting or restarting the first timer if the terminal device receives a PDCCH used to indicate data transmission; starting or restarting the first timer if the terminal device receives a PDCCH used to indicate new transmission; or starting or restarting, by the terminal device, the first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer. Further, the terminal device may make a corresponding decision based on whether the first timer is run, and monitor the PDCCH by using the first search space configuration, or monitor the PDCCH by using the second search space configuration.

With reference to the second aspect or the first possible implementation of the second aspect, in a second possible implementation of the second aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the second aspect or the first or second possible implementation of the second aspect, in a third possible implementation of the second aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the second aspect or the first to the third possible implementations of the second aspect, in a fourth possible implementation of the second aspect, the obtaining, by a terminal device, a first search space configuration and a second search space configuration includes: receiving, by the terminal device, first information sent by a network device, where the first information includes or indicates the first search space configuration; and receiving, by the terminal device, second information sent by the network device, where the second information includes or indicates the second search space configuration.

This embodiment of the disclosure further provides a possible implementation in which the terminal device obtains the first search space configuration and the second search space configuration. The terminal device may receive the first information sent by the network device to obtain the first search space configuration, and receive the second information sent by the network device to obtain the second search space configuration.

With reference to any one of the second aspect or the first to the fourth possible implementations of the second aspect, in a fifth possible implementation of the second aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the second aspect or the first to the fifth possible implementations of the second aspect, in a sixth possible implementation of the second aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the second aspect or the first to the sixth possible implementations of the second aspect, in a seventh possible implementation of the second aspect, the method further includes: monitoring, by the terminal device, the PDCCH based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

With reference to any one of the second aspect or the first to the seventh possible implementations of the second aspect, in an eighth possible implementation of the second aspect, if the first condition is met, a multiple-input multiple-output MIMO layer quantity to be used by the terminal device to receive a physical downlink shared channel PDSCH indicated by the PDCCH is a first MIMO layer quantity, or if the second condition is met, a MIMO layer quantity to be used by the terminal device to receive a PDSCH indicated by the PDCCH is a second MIMO layer quantity; and the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

According to a third aspect, a monitoring method is provided, including: obtaining, by a terminal device, a first search space configuration and a second search space configuration, where the first search space configuration includes a first search space set, the second search space configuration includes a second search space set, and the first search space set is different from the second search space set, or the first search space configuration includes a first search space parameter, the second search space configuration includes a second search space parameter, and the first search space parameter is different from the second search space parameter; further monitoring, by the terminal device, a first PDCCH based on the first search space configuration, where the first PDCCH is used to carry indication information, the indication information is used to indicate the terminal device not to monitor a second PDCCH within a first time period existing after the terminal device receives the indication information, or the indication information is used to indicate the terminal device to monitor the second PDCCH within a second time period existing after the terminal device receives the indication information, and the second PDCCH does not carry the indication information; and monitoring, by the terminal device, the second PDCCH based on the second search space configuration within a time period other than the first time period or within the second time period.

According to the method provided in this embodiment of the disclosure, the terminal device may monitor, based on different search space configurations, the PDCCH that carries the indication information and the PDCCH that does not carry the indication information. The first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the third aspect, in a first possible implementation of the third aspect, the indication information further includes or indicates the second search space configuration.

With reference to the third aspect or the first possible implementation of the third aspect, in a second possible implementation of the third aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

With reference to the third aspect or the first or second possible implementation of the third aspect, in a third possible implementation of the third aspect, the obtaining, by a terminal device, a first search space configuration and a second search space configuration includes: receiving, by the terminal device, first information sent by a network device, where the first information includes or indicates the first search space configuration; and receiving, by the terminal device, second information sent by the network device, where the second information includes or indicates the second search space configuration.

With reference to the third aspect or the first to the third possible implementations of the third aspect, in a fourth possible implementation of the third aspect, the first search space set is a subset of the second search space set.

With reference to the third aspect or the first to the fourth possible implementations of the third aspect, in a fifth possible implementation of the third aspect, the indication information further includes or indicates a MIMO layer quantity to be used for a PDSCH indicated by the second PDCCH.

According to a fourth aspect, a communication method is disclosed, including: if a terminal device receives a first physical downlink control channel PDCCH when a first condition is met, receiving, by the terminal device based on a first multiple-input multiple-output MIMO layer quantity, a physical downlink shared channel PDSCH indicated by the first PDCCH; or if a terminal device receives a second PDCCH when a second condition is met, receiving, by the terminal device based on a second MIMO layer quantity, a PDSCH indicated by the second PDCCH, where the first MIMO layer quantity is different from the second MIMO layer quantity, the first condition includes: a first timer is not in a running state, and the second condition includes: the first timer is in a running state.

In the method provided in this embodiment of the disclosure, the terminal device first determines whether the first condition or the second condition is met, and may further determine, based on a determining result, a MIMO layer quantity to be used to receive the PDSCH. Instead of blindly using a relatively large MIMO layer quantity, the terminal device uses a proper MIMO layer quantity to receive the PDSCH sent by a network device. In this way, power consumption of receiving the PDSCH by the terminal device can be reduced.

With reference to the fourth aspect, in a first possible implementation of the fourth aspect, the method further includes: starting or restarting the first timer if the terminal device receives a PDCCH; starting or restarting the first timer if the terminal device receives a PDCCH used to indicate data transmission; starting or restarting the first timer if the terminal device receives a PDCCH used to indicate new transmission; or starting or restarting, by the terminal device, the first timer if a second timer is started or restarted, where the second timer is used to determine a time length of monitoring a PDCCH by the terminal device after the terminal device receives a PDCCH used to indicate new transmission.

With reference to the fourth aspect or the first possible implementation of the fourth aspect, in a second possible implementation of the fourth aspect, the first condition further includes that a third timer is in a running state, and the third timer is used to determine a time length of monitoring a PDCCH by the terminal device in one discontinuous reception DRX cycle.

With reference to any one of the fourth aspect or the first or second possible implementation of the fourth aspect, in a third possible implementation of the fourth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the fourth aspect or the first to the third possible implementations of the fourth aspect, in a fourth possible implementation of the fourth aspect, the method further includes: receiving, by the terminal device based on the second MIMO layer quantity, the PDSCH indicated by the second PDCCH, when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a fifth aspect, a communication method is disclosed, including: if a terminal device receives a first physical downlink control channel PDCCH when a first condition is met, receiving, by the terminal device based on a first multiple-input multiple-output MIMO layer quantity, a physical downlink shared channel PDSCH indicated by the first PDCCH; or if a terminal device receives a second PDCCH when a second condition is met, receiving, by the terminal device based on a second MIMO layer quantity, a PDSCH indicated by the second PDCCH, where the first MIMO layer quantity is different from the second MIMO layer quantity, the first condition is that the terminal device is between a first moment and a second moment, the second condition is that the terminal device is after the second moment, the first moment may be a start moment of discontinuous reception DRX on duration, and the second moment is a moment at which the terminal device receives the $N^{th}$ PDCCH after the first moment, or the second moment is a moment later than a third moment by first duration, where the third moment may be a moment at which the terminal device receives the $N^{th}$ PDCCH after the first moment, N is an integer greater than or equal to 1, and a length of the first duration is greater than 0.

With reference to the fifth aspect, in a first possible implementation of the fifth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to the fifth aspect or the first possible implementation of the fifth aspect, in a second possible implementation of the fifth aspect, the method further includes: receiving, by the terminal device based on the second MIMO layer quantity, the PDSCH indicated by the second PDCCH, when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a sixth aspect, a communication method is disclosed, including: first receiving, by a terminal device, indication information, where the indication information is used to indicate the terminal device not to monitor a PDCCH within a first time period existing after the terminal device receives the indication information, or the indication information is used to indicate the terminal device to monitor a PDCCH within a second time period existing after the terminal device receives the indication information; and then monitoring, by the terminal device, the PDCCH within a time period other than the first time period or within the second time period. Further, the indication information includes or indicates a MIMO layer quantity, and the terminal device receives a PDSCH based on the MIMO layer quantity included in or indicated by the indication information, where the PDSCH is a PDSCH indicated by the PDCCH monitored by the terminal device.

According to a seventh aspect, a communication method is disclosed, including: sending, by a network device, a PDCCH to a terminal device based on a first search space configuration if a first condition is met; or sending, by a network device, a PDCCH to a terminal device based on a second search space configuration if a second condition is met, where the first condition includes that a first timer of the terminal device is not in a running state, and the second condition includes that the first timer is in a running state, where the first search space configuration includes a first search space set, the second search space configuration includes a second search space set, and the first search space set is different from the second search space; or the first search space configuration is a first search space parameter, the second search space configuration is a second search space parameter, and the first search space parameter is different from the second search space parameter.

With reference to the seventh aspect, in a first possible implementation of the seventh aspect, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the first timer is started or restarted if a second timer is started or restarted, where the second timer is used to determine a time length of monitoring a PDCCH by the terminal device after the terminal device receives a PDCCH used to indicate new transmission.

With reference to the seventh aspect or the first possible implementation of the seventh aspect, in a second possible implementation of the seventh aspect, the first condition further includes that a third timer is in a running state, and the third timer is used to determine a time length of monitoring a PDCCH by the terminal device in one discontinuous reception DRX cycle. For example, the third timer is an on duration timer.

With reference to the seventh aspect or the first or second possible implementation of the seventh aspect, in a third possible implementation of the seventh aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the seventh aspect or the first to the third possible implementations of the seventh aspect, in a fourth possible implementation of the seventh aspect, the method further includes: sending, by the network device, first information to the terminal device, where the first information includes or indicates the first search space configuration; and sending, by the network device, second information to the terminal device, where the second information includes or indicates the second search space configuration.

This embodiment of the disclosure further provides a possible implementation in which the network device notifies the terminal device of the first search space configuration and the second search space configuration. The terminal device may receive the first information sent by the network device to obtain the first search space configuration, and receive the second information sent by the network device to obtain the second search space configuration.

With reference to any one of the seventh aspect or the first to the fourth possible implementations of the seventh aspect, in a fifth possible implementation of the seventh aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the seventh aspect or the first to the fifth possible implementations of the seventh aspect, in a sixth possible implementation of the seventh aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the seventh aspect or the first to the sixth possible implementations of the seventh aspect, in a seventh possible implementation of the seventh aspect, the method further includes: sending, by the network device, the PDCCH based on the second search space when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to an eighth aspect, a communication method is disclosed, including: sending, by a network device, a PDCCH to a terminal device based on a first search space configuration if a first condition is met; or sending, by a network device, a PDCCH to a terminal device based on a second search space configuration if a second condition is met, where the first search space configuration includes a first search space set, the second search space configuration includes a second search space set, and the first search space set is different from the second search space; or the first search space configuration is a first search space parameter, the second search space configuration is a second search space parameter, and the first search space parameter is different from the second search space parameter. The first condition includes: the terminal device is between a first moment and a second moment. The second condition includes: the terminal device is after the second moment. It should be noted that the first moment may be a start moment of discontinuous reception DRX on duration. The second moment is a third moment, and the third moment is a moment at which the terminal device receives the $N^{th}$ PDCCH after the first moment. Alternatively, the second moment is a moment later than a third moment by first duration. N is an integer greater than or equal to 1, and a length of the first duration is greater than 0.

According to the monitoring method provided in this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the eighth aspect, in a first possible implementation of the eighth aspect, the method further includes: starting or restarting the first timer if the terminal device receives a PDCCH; starting or restarting the first timer if the terminal device receives a PDCCH used to indicate data transmission; starting or restarting the first timer if the terminal device receives a PDCCH used to indicate new transmission; or starting or restarting, by the terminal device, the first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer.

Further, the terminal device may make a corresponding decision based on whether the first timer is run, and monitor the PDCCH by using the first search space configuration, or monitor the PDCCH by using the second search space configuration.

With reference to the eighth aspect or the first possible implementation of the eighth aspect, in a second possible implementation of the eighth aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the eighth aspect or the first or second possible implementation of the eighth aspect, in a third possible implementation of the eighth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the eighth aspect or the first to the third possible implementations of the eighth aspect, in a fourth possible implementation of the eighth aspect, that the terminal device obtains the first search space configuration and the second search space configuration includes: receiving, by the terminal device, first information sent by the network device, where the first information includes or indicates the first search space configuration; and receiving, by the terminal device, second information sent by the network device, where the second information includes or indicates the second search space configuration.

This embodiment of the disclosure further provides a possible implementation in which the terminal device obtains the first search space configuration and the second search space configuration. The terminal device may receive the first information sent by the network device to obtain the first search space configuration, and receive the second information sent by the network device to obtain the second search space configuration.

With reference to any one of the eighth aspect or the first to the fourth possible implementations of the eighth aspect, in a fifth possible implementation of the eighth aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the eighth aspect or the first to the fifth possible implementations of the eighth aspect, in a sixth possible implementation of the fifth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the eighth aspect or the first to the sixth possible implementations of the eighth aspect, in a seventh possible implementation of the fifth aspect, the method further includes: sending, by the network device, the PDCCH to the terminal device based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

With reference to any one of the eighth aspect or the first to the seventh possible implementations of the eighth aspect, in an eighth possible implementation of the eighth aspect, if the first condition is met, a multiple-input multiple-output MIMO layer quantity to be used by the network device to send a PDSCH indicated by the PDCCH is a first MIMO layer quantity, or if the second condition is met, a MIMO layer quantity to be used by the network device to send a PDSCH indicated by the PDCCH is a second MIMO layer quantity; and the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

According to a ninth aspect, a communication method is disclosed, including: sending, by a network device, a first PDCCH to a terminal device based on a first search space configuration, where the first PDCCH is used to carry indication information, the indication information is used to indicate the terminal device to stop monitoring a second PDCCH within first duration existing after the terminal device receives the indication information, or the indication information is used to indicate the terminal device to monitor the second PDCCH within second duration existing after the terminal device receives the indication information, and the second PDCCH does not carry the indication information; and sending, by the network device, the second PDCCH to the terminal device based on a second search space configuration within duration other than the first duration or within the second duration.

The first search space configuration is a first search space set, the second search space configuration is a second search space set, and the first search space set is different from the second search space set; or the first search space configuration is a first search space parameter, the second search space configuration is a second search space parameter, and the first search space parameter is different from the second search space parameter.

With reference to the ninth aspect, in a first possible implementation of the ninth aspect, the indication information further includes or indicates the second search space configuration.

With reference to the ninth aspect or the first possible implementation of the ninth aspect, in a second possible implementation of the ninth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

With reference to the ninth aspect or the first or second possible implementation of the ninth aspect, in a third possible implementation of the ninth aspect, the method further includes: sending first information to the terminal device, where the first information includes or indicates the first search space configuration; and sending second information to the terminal device, where the second information includes or indicates the second search space configuration.

With reference to the ninth aspect or the first to the third possible implementations of the ninth aspect, in a fourth possible implementation of the ninth aspect, the first search space set is a subset of the second search space set.

With reference to the ninth aspect or the first to the fourth possible implementations of the ninth aspect, in a fifth possible implementation of the ninth aspect, the indication information further includes or indicates a MIMO layer quantity to be used for a PDSCH indicated by the second PDCCH.

According to a tenth aspect, a communication method is disclosed, including:
 sending, by a network device, a first physical downlink control channel PDCCH to a terminal device when a first condition is met, and sending, by the network device, a first physical downlink shared channel PDSCH to the terminal device based on a first multiple-input multiple-output MIMO layer quantity, where the first PDCCH is used to indicate the first PDSCH; or
 sending, by a network device, a second PDCCH to a terminal device when a second condition is met, and sending, by the network device, a second PDSCH to the terminal device based on a second MIMO layer quantity, where the second PDCCH is used to indicate the second PDSCH, and the first MIMO layer quantity is different from the second MIMO layer quantity.

The first condition includes that a first timer is not in a running state, and the second condition includes that the first timer is in a running state.

With reference to the tenth aspect, in a first possible implementation of the tenth aspect, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the first timer is started or restarted if a second timer is started or restarted, where the second timer is used to determine a time length of monitoring a PDCCH by the terminal device after the terminal device receives a PDCCH used to indicate new transmission.

With reference to the tenth aspect or the first possible implementation of the tenth aspect, in a second possible implementation of the tenth aspect, the first condition further includes that a third timer is in a running state, and the third timer is used to determine a time length of monitoring a PDCCH by the terminal device in one discontinuous reception DRX cycle.

With reference to any one of the tenth aspect or the first or second possible implementation of the tenth aspect, in a third possible implementation of the tenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the tenth aspect or the first to the third possible implementations of the tenth aspect, in a fourth possible implementation of the tenth aspect, the method further includes: sending, by the network device, the second PDSCH to the terminal device based on the second MIMO layer quantity when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to an eleventh aspect, a communication method is disclosed, including: sending, by a network device, a first physical downlink control channel PDCCH to a terminal device when a first condition is met, and sending, by the network device, a first physical downlink shared channel PDSCH to the terminal device based on a first multiple-input multiple-output MIMO layer quantity, where the first PDCCH is used to indicate the first PDSCH; or
 sending, by a network device, a second PDCCH to a terminal device when a second condition is met, and sending, by the network device, a second PDSCH to the terminal device based on a second MIMO layer quantity, where the second PDCCH is used to indicate the second PDSCH, the first MIMO layer quantity is different from the second MIMO layer quantity, the first condition is that the terminal device is between a first moment and a second moment, the second condition is that the terminal device is after the second moment, the first moment may be a start moment of discontinuous reception DRX on duration, the second moment is a third moment that is a moment at which the terminal device receives the $N^{th}$ PDCCH after the first moment, or the second moment is a moment later than a third moment by first duration, N is an integer greater than or equal to 1, and a length of the first duration is greater than 0.

With reference to the eleventh aspect, in a first possible implementation of the eleventh aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to the eleventh aspect or the first possible implementation of the eleventh aspect, in a second possible implementation of the eleventh aspect, the method further includes: sending, by the network device, the second PDSCH to the terminal device based on the second MIMO layer quantity when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a twelfth aspect, a communication method is disclosed, including: sending, by a network device, indication information, where the indication information is used to indicate a terminal device to stop monitoring a PDCCH within first duration existing after the terminal device receives the indication information, or the indication information is used to indicate a terminal device to monitor a PDCCH within second duration existing after the terminal device receives the indication information; sending, by the network device, the PDCCH to the terminal within duration other than the first duration or within the second duration, where the indication information includes or indicates a MIMO layer quantity; and sending, by the network device, a physical downlink shared channel PDSCH to the terminal based on the MIMO layer quantity included in or indicated by the indication information, where the PDCCH is used to indicate the PDSCH.

According to a thirteenth aspect, a terminal device is disclosed, including: a processing unit, configured to obtain a first search space configuration and a second search space configuration, where the first search space configuration includes a first search space set, the second search space configuration includes a second search space set, and the first search space set is different from the second search space set; or the first search space configuration includes a first search space parameter, the second search space configuration includes a second search space parameter, and the first search space parameter is different from the second search space parameter; and the processing unit is further configured to: monitor a PDCCH based on the first search space configuration if a first condition is met, where the first condition includes: a first timer is not in a running state; or monitor a PDCCH based on the second search space configuration if a second condition is met, where the second condition includes: a first timer is in a running state.

With reference to the thirteenth aspect, in a first possible implementation of the thirteenth aspect, the terminal device further includes a receiving unit; and the processing unit is further configured to: start or restart the first timer if the receiving unit receives a PDCCH; start or restart the first timer if the receiving unit receives a PDCCH used to indicate data transmission; start or restart the first timer if the receiving unit receives a PDCCH used to indicate new transmission; or start or restart, by the terminal device, the first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer. Further, the terminal device may make a corresponding decision based on whether the first timer is run, and monitor the PDCCH by using the first search space configuration, or monitor the PDCCH by using the second search space configuration.

With reference to the thirteenth aspect or the first possible implementation of the thirteenth aspect, in a second possible implementation of the thirteenth aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the thirteenth aspect or the first or second possible implementation of the thirteenth aspect, in a third possible implementation of the thirteenth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the thirteenth aspect or the first to the third possible implementations of the thirteenth aspect, in a fourth possible implementation of the thirteenth aspect, the receiving unit is further configured to receive first information sent by a network device, where the first information includes or indicates the first search space configuration; and the processing unit is further configured to obtain the first search space configuration based on the first information received by the receiving unit; and the receiving unit is further configured to receive second information sent by the network device, where the second information includes or indicates the second search space configuration; and the processing unit is further configured to obtain the second search space configuration based on the second information received by the receiving unit.

This embodiment of the disclosure further provides a possible implementation in which the terminal device obtains the first search space configuration and the second search space configuration. The terminal device may receive the first information sent by the network device to obtain the first search space configuration, and receive the second information sent by the network device to obtain the second search space configuration.

With reference to any one of the thirteenth aspect or the first to the fourth possible implementations of the thirteenth aspect, in a fifth possible implementation of the thirteenth aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the thirteenth aspect or the first to the fourth possible implementations of the thirteenth aspect, in a fifth possible implementation of the thirteenth aspect, if the first condition is met, a multiple-input multiple-output MIMO layer quantity to be used by the terminal device to receive a physical downlink shared channel PDSCH indicated by the PDCCH is a first MIMO layer quantity, or if the second condition is met, a MIMO layer quantity to be used by the terminal device to receive a PDSCH indicated by the PDCCH is a second MIMO layer quantity; and the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

With reference to any one of the thirteenth aspect or the first to the fifth possible implementations of the thirteenth aspect, in a sixth possible implementation of the thirteenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the thirteenth aspect or the first to the sixth possible implementations of the thirteenth aspect, in a seventh possible implementation of the thirteenth aspect, the processing unit is further configured to monitor the PDCCH based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a fourteenth aspect, a terminal device is disclosed, including: a processing unit, configured to obtain a first search space configuration and a second search space configuration, where the first search space configuration includes a first search space set, the second search space configuration includes a second search space set, and the first search space set is different from the second search space set; or the first search space configuration includes a first search space parameter, the second search space configuration includes a second search space parameter, and the first search space parameter is different from the second search space parameter. The processing unit is further configured to: monitor a PDCCH based on the first search space configuration if a first condition is met, or monitor a PDCCH based on the second search space configuration if a second condition is met. The first condition includes: the terminal device is between a first moment and a second moment. The second condition includes: the terminal device is after the second moment. It should be noted that the first moment may be a start moment of discontinuous reception DRX on duration. The second moment is a moment at which the terminal device receives the $N^{th}$ PDCCH after the first moment. Alternatively, the second moment is a moment later than a third moment by first duration, and the third moment may be a moment at which the terminal device receives the $N^{th}$ PDCCH after the first moment. N is an integer greater than or equal to 1, and a length of the first duration is greater than 0.

In this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the fourteenth aspect, in a first possible implementation of the fourteenth aspect, the processing unit is further configured to: start or restart a first timer if a receiving unit receives a PDCCH; start or restart a first timer if a receiving unit receives a PDCCH used to indicate data transmission; start or restart a first timer if a receiving unit receives a PDCCH used to indicate new transmission; or start or restart a first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer. Further, the terminal device may make a corresponding decision based on whether the first timer is run, and monitor the PDCCH by using the first search space configuration, or monitor the PDCCH by using the second search space configuration.

With reference to the fourteenth aspect or the first possible implementation of the fourteenth aspect, in a second possible implementation of the fourteenth aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the fourteenth aspect or the first or second possible implementation of the fourteenth aspect, in a third possible implementation of the fourteenth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the fourteenth aspect or the first to the third possible implementations of the fourteenth aspect, in a fourth possible implementation of the fourteenth aspect, the receiving unit is specifically configured to receive first information sent by a network device, where the first information includes or indicates the first search space configuration; the processing unit is specifically configured to obtain the first search space configuration based on the first information received by the receiving unit; the receiving unit is specifically configured to receive second information sent by the network device, where the second information includes or indicates the second search space configuration; and the processing unit is specifically configured to obtain the second search space configuration based on the second information received by the receiving unit.

This embodiment of the disclosure further provides a possible implementation in which the terminal device obtains the first search space configuration and the second search space configuration. The terminal device may receive the first information sent by the network device to obtain the first search space configuration, and receive the second information sent by the network device to obtain the second search space configuration.

With reference to any one of the fourteenth aspect or the first to the fourth possible implementations of the fourteenth aspect, in a fifth possible implementation of the fourteenth aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the fourteenth aspect or the first to the fifth possible implementations of the fourteenth aspect, in a sixth possible implementation of the fourteenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to the fourteenth aspect or the first to the sixth possible implementations of the fourteenth aspect, in a seventh possible implementation of the fourteenth aspect, the method further includes: monitoring, by the terminal device, the PDCCH based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

With reference to any one of the fourteenth aspect or the first to the seventh possible implementations of the fourteenth aspect, in an eighth possible implementation of the fourteenth aspect, if the first condition is met, a multiple-input multiple-output MIMO layer quantity to be used by the terminal device to receive a physical downlink shared channel PDSCH indicated by the PDCCH is a first MIMO layer quantity, or if the second condition is met, a MIMO layer quantity to be used by the terminal device to receive a PDSCH indicated by the PDCCH is a second MIMO layer quantity; and the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

According to a fifteenth aspect, a terminal device is disclosed, including a processing unit, configured to obtain a first search space configuration and a second search space configuration, where the first search space configuration includes a first search space set, the second search space configuration includes a second search space set, and the first search space set is different from the second search space set; or the first search space configuration includes a first search space parameter, the second search space configuration includes a second search space parameter, and the first search space parameter is different from the second search space parameter. Further, the processing unit is configured to monitor a first PDCCH based on the first search space configuration, where the first PDCCH is used to carry indication information. The indication information is used to indicate the terminal device not to monitor a second PDCCH within a first time period existing after the terminal device receives the indication information, or the indication information is used to indicate the terminal device to monitor the second PDCCH within a second time period existing after the terminal device receives the indication information. The second PDCCH does not carry the indication information. In addition, the processing unit is further configured to monitor the second PDCCH based on the second search space configuration within a time period other than the first time period or within the second time period.

In this embodiment of the disclosure, the terminal device may monitor, based on different search space configurations, the PDCCH that carries the indication information and the PDCCH that does not carry the indication information. The first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device. With reference to the fifteenth aspect, in a first possible implementation of the fifteenth aspect, the indication information further includes or indicates the second search space configuration.

With reference to the fifteenth aspect or the first possible implementation of the fifteenth aspect, in a second possible implementation of the fifteenth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

With reference to the fifteenth aspect or the first or second possible implementation of the fifteenth aspect, in a third possible implementation of the fifteenth aspect, the terminal device further includes a receiving unit. The receiving unit is specifically configured to receive first information sent by a network device, where the first information includes or indicates the first search space configuration; and the processing unit is specifically configured to obtain the first search space configuration based on the first information received by the receiving unit. The receiving unit is specifically configured to receive second information sent by the network device, where the second information includes or indicates the second search space configuration; and the processing unit is specifically configured to obtain the second search space configuration based on the second information received by the receiving unit.

With reference to the fifteenth aspect or the first to the third possible implementations of the fifteenth aspect, in a fourth possible implementation of the fifteenth aspect, the first search space set is a subset of the second search space set.

With reference to the fifteenth aspect or the first to the fourth possible implementations of the fifteenth aspect, in a fifth possible implementation of the fifteenth aspect, the indication information further includes or indicates a MIMO layer quantity to be used for a PDSCH indicated by the second PDCCH.

According to a sixteenth aspect, a terminal device is disclosed, including a receiving unit, configured to: if a first physical downlink control channel PDCCH is received when a first condition is met, receive, based on a first multiple-input multiple-output MIMO layer quantity, a physical downlink shared channel PDSCH indicated by the first PDCCH; or if a second PDCCH is received when a second condition is met, receive, based on a second MIMO layer quantity, a PDSCH indicated by the second PDCCH, where the first MIMO layer quantity is different from the second MIMO layer quantity. The first condition includes that a first timer is not in a running state, and the second condition includes that the first timer is in a running state.

The terminal device provided in this embodiment of the disclosure first determines whether the first condition or the second condition is met, and may further determine, based on a determining result, a MIMO layer quantity to be used to receive the PDSCH. Instead of blindly using a relatively large MIMO layer quantity, the terminal device uses a proper MIMO layer quantity to receive the PDSCH sent by a network device. In this way, power consumption of receiving the PDSCH by the terminal device can be reduced.

With reference to the sixteenth aspect, in a first possible implementation of the sixteenth aspect, a processing unit is further configured to: start or restart the first timer if the receiving unit receives a PDCCH; start or restart the first timer if the receiving unit receives a PDCCH used to indicate data transmission; start or restart the first timer if the receiving unit receives a PDCCH used to indicate new transmission; or start or restart the first timer if a second timer is started or restarted, where the second timer is used to determine a time length of monitoring a PDCCH by the terminal device after the terminal device receives a PDCCH used to indicate new transmission.

With reference to the sixteenth aspect or the first possible implementation of the sixteenth aspect, in a second possible implementation of the sixteenth aspect, the first condition further includes that a third timer is in a running state, and the third timer is used to determine a time length of monitoring a PDCCH by the terminal device in one discontinuous reception DRX cycle.

With reference to the sixteenth aspect or the first or second possible implementation of the sixteenth aspect, in a third possible implementation of the sixteenth aspect, the first condition is that the terminal device is between a first moment and a second moment, and the second condition is that the terminal device is after the second moment. The first moment may be a start moment of discontinuous reception DRX on duration (On Duration). The second moment is a moment at which the terminal device receives the $N^{th}$ PDCCH after the first moment. Alternatively, the second moment is a moment later than a third moment by first duration, and the third moment may be a moment at which the terminal device receives the $N^{th}$ PDCCH after the first moment. N is an integer greater than or equal to 1, and a length of the first duration is greater than 0.

With reference to any one of the sixteenth aspect or the first or second possible implementation of the sixteenth aspect, in a third possible implementation of the sixteenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the sixteenth aspect or the first to the third possible implementations of the sixteenth aspect, in a fourth possible implementation of the sixteenth aspect, the method further includes: receiving, by the terminal device based on the second MIMO layer quantity, the PDSCH indicated by the second PDCCH, when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a seventeenth aspect, a terminal device is disclosed, including a receiving unit, configured to: if a first physical downlink control channel PDCCH is received when a first condition is met, receive, based on a first multiple-input multiple-output MIMO layer quantity, a physical downlink shared channel PDSCH indicated by the first PDCCH; or if a second PDCCH is received when a second condition is met, receive, based on a second MIMO layer quantity, a PDSCH indicated by the second PDCCH, where the first MIMO layer quantity is different from the second MIMO layer quantity. The first condition is that the terminal device is between a first moment and a second moment, and the second condition is that the terminal device is after the second moment. The first moment may be a start moment of discontinuous reception DRX on duration. The second moment is a third moment that is a moment at which the terminal device receives the $N^{th}$ PDCCH after the first moment. Alternatively, the second moment is a moment later than a third moment by first duration, and the third moment may be a moment at which the terminal device receives the $N^{th}$ PDCCH after the first moment. N is an integer greater than or equal to 1, and a length of the first duration is greater than 0.

With reference to the seventeenth aspect, in a first possible implementation of the seventeenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to the seventeenth aspect or the first possible implementation of the seventeenth aspect, in a second possible implementation of the seventeenth aspect, the method further includes: receiving, by the terminal device based on the second MIMO layer quantity, the PDSCH indicated by the second PDCCH, when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to an eighteenth aspect, a terminal device is disclosed, including: a receiving unit, configured to receive indication information, where the indication information is used to indicate the terminal device not to monitor a PDCCH within a first time period existing after the terminal device receives the indication information, or the indication information is used to indicate the terminal device to monitor a PDCCH within a second time period existing after the terminal device receives the indication information; and a processing unit, configured to monitor the PDCCH within a time period other than the first time period or within the second time period, where the receiving unit is further configured to receive a PDSCH based on a MIMO layer quantity indicated by the indication information, where the PDSCH is a PDSCH indicated by the PDCCH monitored by the terminal device.

According to a nineteenth aspect, a network device is disclosed, including a sending unit, configured to: send a PDCCH to a terminal device based on a first search space configuration if a first condition is met; or send, by the network device, a PDCCH to a terminal device based on a second search space configuration if a second condition is met, where the first condition includes that a first timer of the terminal device is not in a running state, and the second condition includes that the first timer is in a running state. The first search space configuration includes a first search space set, the second search space configuration includes a second search space set, and the first search space set is different from the second search space; or the first search space configuration is a first search space parameter, the second search space configuration is a second search space parameter, and the first search space parameter is different from the second search space parameter.

With reference to the nineteenth aspect, in a first possible implementation of the nineteenth aspect, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the first timer is started or restarted if a second timer is started or restarted, where the second timer is used to determine a time length of monitoring a PDCCH by the terminal device after the terminal device receives a PDCCH used to indicate new transmission.

With reference to the nineteenth aspect or the first possible implementation of the nineteenth aspect, in a second possible implementation of the nineteenth aspect, the first condition further includes that a third timer is in a running state, and the third timer is used to determine a time length of monitoring a PDCCH by the terminal device in one discontinuous reception DRX cycle. For example, the third timer is an on duration timer.

With reference to the nineteenth aspect or the first or second possible implementation of the nineteenth aspect, in a third possible implementation of the nineteenth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the nineteenth aspect or the first to the third possible implementations of the nineteenth aspect, in a fourth possible implementation of the nineteenth aspect, the sending unit is further configured to send first information to the terminal device, where the first information includes or indicates the first search space configuration; and the sending unit is further configured to send second information to the terminal device, where the second information includes or indicates the second search space configuration.

This embodiment of the disclosure further provides a possible implementation in which the network device notifies the terminal device of the first search space configuration and the second search space configuration. The terminal device may receive the first information sent by the network device to obtain the first search space configuration, and receive the second information sent by the network device to obtain the second search space configuration.

With reference to any one of the nineteenth aspect or the first to the fourth possible implementations of the nineteenth aspect, in a fifth possible implementation of the nineteenth aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the nineteenth aspect or the first to the fifth possible implementations of the nineteenth aspect, in a sixth possible implementation of the nineteenth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the nineteenth aspect or the first to the sixth possible implementations of the nineteenth aspect, in a seventh possible implementation of the nineteenth aspect, the sending unit is further configured to send, by the network device, the PDCCH based on the second search space when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a twentieth aspect, a network device is disclosed, including a sending unit, configured to: send a PDCCH to a terminal device based on a first search space configuration when a first condition is met; or send a PDCCH to a terminal device based on a second search space configuration if a second condition is met, where the first search space configuration includes a first search space set, the second search space configuration includes a second search space set, and the first search space set is different from the second search space; or the first search space configuration is a first search space parameter, the second search space configuration is a second search space parameter, and the first search space parameter is different from the second search space parameter. The first condition includes: the terminal device is between a first moment and a second moment. The second condition includes: the terminal device is after the second moment. It should be noted that the first moment may be a start moment of discontinuous reception DRX on duration. The second moment is a third moment, and the third moment is a moment at which the terminal device receives the $N^{th}$ PDCCH after the first moment. Alternatively, the second moment is a moment later than a third moment by first duration. N is an integer greater than or equal to 1, and a length of the first duration is greater than 0.

In this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

With reference to the twentieth aspect, in a first possible implementation of the twentieth aspect, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the terminal device starts or restarts a first timer if a second timer is started or restarted, where the second timer is used to determine a time length of monitoring a PDCCH by the terminal device after the terminal device receives a PDCCH used to indicate new transmission.

This embodiment of the disclosure provides several possible implementations of starting or restarting the first timer. Further, the terminal device may make a corresponding decision based on whether the first timer is run, and monitor the PDCCH by using the first search space configuration, or monitor the PDCCH by using the second search space configuration.

With reference to the twentieth aspect or the first possible implementation of the twentieth aspect, in a second possible implementation of the twentieth aspect, the first condition further includes that a third timer is in a running state, and the third timer is used to determine a time length of monitoring a PDCCH by the terminal device in one discontinuous reception DRX cycle. For example, the third timer is an on duration timer.

This embodiment of the disclosure provides another possible implementation of the first condition. Only when the first timer is not in a running state and the third timer is in a running state, it is determined that the first condition is met, and then the PDCCH is monitored based on the first search space configuration.

With reference to the twentieth aspect or the first or second possible implementation of the twentieth aspect, in a third possible implementation of the twentieth aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to any one of the twentieth aspect or the first to the third possible implementations of the twentieth aspect, in a fourth possible implementation of the twentieth aspect, the sending unit is further configured to send first information to the terminal device, where the first information includes or indicates the first search space configuration; and the sending unit is further configured to send second information to the terminal device, where the second information includes or indicates the second search space configuration.

This embodiment of the disclosure further provides a possible implementation in which the network device configures the first search space configuration and the second search space configuration for the terminal device. The terminal device may receive the first information sent by the network device to obtain the first search space configuration, and receive the second information sent by the network device to obtain the second search space configuration.

With reference to any one of the twentieth aspect or the first to the fourth possible implementations of the twentieth aspect, in a fifth possible implementation of the twentieth aspect, the first search space set is a subset of the second search space set.

In this embodiment of the disclosure, because the first search space set is the subset of the second search space set, when the first condition is met, the terminal device monitors a relatively small quantity of candidate PDCCHs, so that power consumption of the terminal device can be effectively reduced.

With reference to any one of the twentieth aspect or the first to the fifth possible implementations of the twentieth aspect, in a sixth possible implementation of the twentieth aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the twentieth aspect or the first to the sixth possible implementations of the twentieth aspect, in a seventh possible implementation of the twentieth aspect, the method further includes: sending, by the network device, the PDCCH to the terminal device based on the second search space configuration when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

With reference to any one of the twentieth aspect or the first to the seventh possible implementations of the twentieth aspect, in an eighth possible implementation of the twentieth aspect, the sending unit is further configured to: if the first condition is met, send, based on a first MIMO layer quantity, a PDSCH indicated by the PDCCH; or if the second condition is met, send, based on a second MIMO layer quantity, a PDSCH indicated by the PDCCH, where the first MIMO layer quantity is different from the second MIMO layer quantity.

According to the method provided in this embodiment of the disclosure, the terminal device can use a proper MIMO layer quantity to receive the PDSCH sent by the network device, to reduce power consumption of receiving the PDSCH by the terminal device.

According to a twenty-first aspect, a network device is disclosed, including a sending unit, configured to send a first PDCCH to a terminal device based on a first search space configuration, where the first PDCCH is used to carry indication information, the indication information is used to indicate the terminal device to stop monitoring a second PDCCH within first duration existing after the terminal device receives the indication information, or the indication information is used to indicate the terminal device to monitor the second PDCCH within second duration existing after the terminal device receives the indication information, and the second PDCCH does not carry the indication information. The sending unit is further configured to send the second PDCCH to the terminal device based on a second search space configuration within duration other than the first duration or within the second duration, where the first search space configuration is a first search space set, the second search space configuration is a second search space set, and the first search space set is different from the second search space set; or the first search space configuration is a first search space parameter, the second search space configuration is a second search space parameter, and the first search space parameter is different from the second search space parameter.

With reference to the twenty-first aspect, in a first possible implementation of the twenty-first aspect, the indication information further includes or indicates the second search space configuration.

With reference to the twenty-first aspect or the first possible implementation of the twenty-first aspect, in a second possible implementation of the twenty-first aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

With reference to the twenty-first aspect or the first or second possible implementation of the twenty-first aspect, in a third possible implementation of the twenty-first aspect, the sending unit is further configured to: send first information to the terminal device, where the first information includes or indicates the first search space configuration; and send second information to the terminal device, where the second information includes or indicates the second search space configuration.

With reference to the twenty-first aspect or the first to the third possible implementations of the twenty-first aspect, in a fourth possible implementation of the twenty-first aspect, the first search space set is a subset of the second search space set.

With reference to the twenty-first aspect or the first to the fourth possible implementations of the twenty-first aspect, in a fifth possible implementation of the twenty-first aspect, the indication information further includes or indicates a MIMO layer quantity to be used for a PDSCH indicated by the second PDCCH.

According to a twenty-second aspect, a network device is disclosed, including a sending unit, configured to: send a first PDCCH to a terminal device when a first condition is met, and send, by the network device, a first physical downlink shared channel PDSCH to the terminal device based on a first MIMO layer quantity, where the first PDCCH is used to indicate the first PDSCH; or send a second PDCCH to a terminal device when a second condition is met, and send, by the network device, a second PDSCH to the terminal device based on a second MIMO layer quantity, where the second PDCCH is used to indicate the second PDSCH, and the first MIMO layer quantity is different from the second MIMO layer quantity.

The first condition includes that a first timer is not in a running state, and the second condition includes that the first timer is in a running state.

With reference to the twenty-second aspect, in a first possible implementation of the twenty-second aspect, the first search space parameter includes at least one of the following parameters: a PDCCH monitoring period, PDCCH monitoring duration in each PDCCH monitoring period, a quantity of candidate PDCCHs, a CCE aggregation level, and an associated control resource set; and the second search space parameter includes at least one of the following parameters: a PDCCH monitoring period, PDCCH monitoring duration in each PDCCH monitoring period, a quantity of candidate PDCCHs, a CCE aggregation level, and an associated control resource set.

This embodiment of the disclosure provides several possible search space parameters. A resource used by the terminal device to monitor the PDCCH may be adjusted by configuring different search space parameters.

With reference to the twenty-second aspect, in a first possible implementation of the twenty-second aspect, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the first timer is started or restarted if a second timer is started or restarted, where the second timer is used to determine a time length of monitoring a PDCCH by the terminal device after the terminal device receives a PDCCH used to indicate new transmission.

With reference to the twenty-second aspect or the first possible implementation of the twenty-second aspect, in a second possible implementation of the twenty-second aspect, the first condition further includes that a third timer is in a running state, and the third timer is used to determine a time length of monitoring a PDCCH by the terminal device in one discontinuous reception DRX cycle.

With reference to any one of the twenty-second aspect or the first or second possible implementation of the twenty-second aspect, in a third possible implementation of the twenty-second aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to any one of the twenty-second aspect or the first to the third possible implementations of the twenty-second aspect, in a fourth possible implementation of the twenty-second aspect, the method further includes: sending, by the network device, the second PDSCH to the terminal device based on the second MIMO layer quantity when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a twenty-third aspect, a network device is disclosed, including a sending unit, configured to: send a first physical downlink control channel PDCCH to a terminal device when a first condition is met, and send a first physical downlink shared channel PDSCH to the terminal device based on a first multiple-input multiple-output MIMO layer quantity, where the first PDCCH is used to indicate the first PDSCH; or send a second PDCCH to a terminal device when a second condition is met, and send a second PDSCH to the terminal device based on a second MIMO layer quantity, where the second PDCCH is used to indicate the second PDSCH, and the first MIMO layer quantity is different from the second MIMO layer quantity. The first condition is that the terminal device is between a first moment and a second moment, and the second condition is that the terminal device is after the second moment. The first moment may be a start moment of discontinuous reception DRX on duration. The second moment is a third moment, and the third moment is a moment at which the terminal device receives the $N^{th}$ PDCCH after the first moment. Alternatively, the second moment is a moment later than a third moment by first duration. N is an integer greater than or equal to 1, and a length of the first duration is greater than 0.

With reference to the twenty-third aspect, in a first possible implementation of the twenty-third aspect, the first condition further includes one or more of the following cases: a downlink retransmission timer is not in a running state; an uplink retransmission timer is not in a running state; a contention resolution timer is not in a running state; a scheduling request sent by the terminal device is not in a pending state; and the terminal device is not in a state in which the terminal device receives, after successfully receiving a random access response RAR, no PDCCH used to indicate new transmission, where the PDCCH used to indicate new transmission is scrambled by using a cell radio network temporary identifier C-RNTI, the RAR is a response to a target random access preamble, and the target random access preamble is not a contention-based random access preamble.

With reference to the twenty-third aspect or the first possible implementation of the twenty-third aspect, in a second possible implementation of the twenty-third aspect, the method further includes: sending, by the network device, the second PDSCH to the terminal device based on the second MIMO layer quantity when one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

According to a twenty-fourth aspect, a network device is disclosed, including a sending unit, configured to send indication information, where the indication information is used to indicate a terminal device to stop monitoring a PDCCH within first duration existing after the terminal device receives the indication information, or the indication information is used to indicate a terminal device to monitor a PDCCH within second duration existing after the terminal device receives the indication information, and the sending unit is further configured to: send the PDCCH to the terminal within duration other than the first duration or within the second duration, and send a physical downlink shared channel PDSCH to the terminal based on a MIMO layer quantity indicated by the indication information, where the PDCCH is used to indicate the PDSCH.

According to a twenty-fifth aspect, a terminal device is disclosed, including one or more processors and one or more memories.

The one or more memories are coupled to the one or more processors, the one or more memories are configured to store computer program code, the computer program code includes a computer instruction, and when the one or more processors execute the computer instruction, the terminal device is enabled to perform the method according to any one of the first aspect to the sixth aspect and the possible implementations.

According to a twenty-sixth aspect, a network device is disclosed, including one or more processors and one or more memories.

The one or more memories are coupled to the one or more processors, the one or more memories are configured to store computer program code, the computer program code includes a computer instruction, and when the one or more processors execute the computer instruction, the network device is enabled to perform the method according to any one of the seventh aspect to the twelfth aspect and the possible implementations.

According to a twenty-seventh aspect, a computer-readable storage medium is disclosed. The computer-readable storage medium stores an instruction. When the computer-readable storage medium is run on the terminal device according to any one of the thirteenth aspect to the eighteenth aspect and the possible implementations, the terminal device is enabled to perform the method according to any one of the first aspect to the sixth aspect and the possible implementations.

According to a twenty-eighth aspect, a computer-readable storage medium is disclosed. The computer-readable storage medium stores an instruction. When the computer-readable storage medium is run on the network device according to any one of the nineteenth aspect to the twenty-fourth aspect and the possible implementations, the network device is enabled to perform the method according to any one of the first aspect to the fourth aspect and the possible implementations.

According to a twenty-ninth aspect, a wireless communications apparatus is disclosed. The wireless communications apparatus stores an instruction. When the wireless communications apparatus is run on the terminal device according to any one of the thirteenth aspect to the eighteenth aspect and the possible implementations, the terminal device is enabled to perform the method according to any one of the first aspect to the sixth aspect and the possible implementations. The wireless communications apparatus is a chip.

According to a thirtieth aspect, a wireless communications apparatus is disclosed. The wireless communications apparatus stores an instruction. When the wireless communications apparatus is run on the network device according to any one of the nineteenth aspect to the twenty-fourth aspect and the possible implementations, the network device is enabled to perform the method according to any one of the seventh aspect to the twelfth aspect and the possible implementations. The wireless communications apparatus is a chip.

DESCRIPTION OF EMBODIMENTS

The following further describes this application with reference to the accompanying drawings and embodiments.

Figure 1:
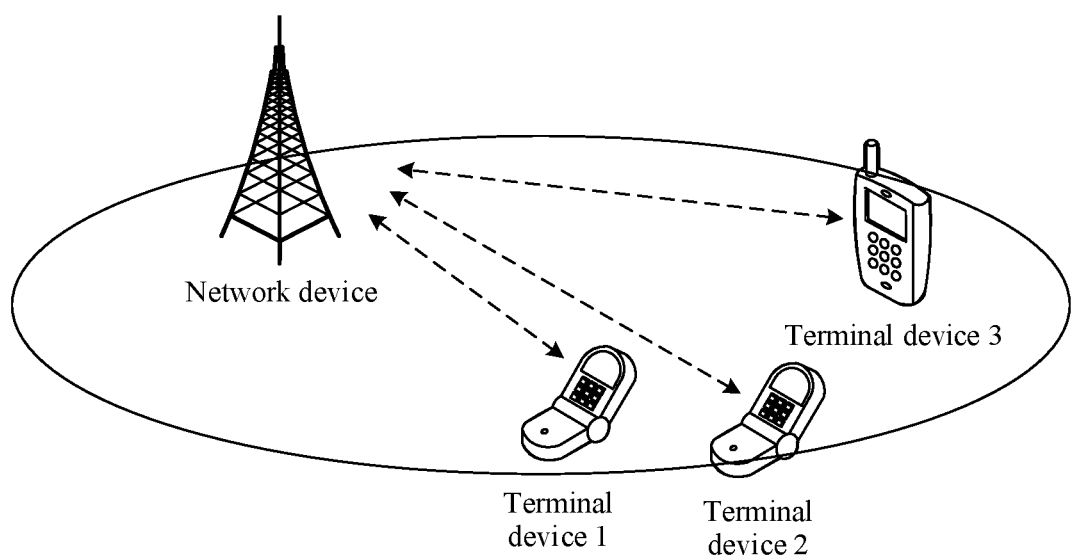
FIG. 1 is an architectural diagram of a communications network according to an embodiment of the disclosure.

FIG. 1 is an architectural diagram of a communications network according to an embodiment of the disclosure. The communications network includes a network device and a terminal device. The network device may schedule the terminal device to receive downlink data or schedule the terminal device to send uplink data. The network device in the embodiments of the disclosure includes a base station (BS). The base station may have a plurality of forms, for example, a macro base station, a micro base station, a relay station, and an access point. For example, the base station in the embodiments of the disclosure may be a base station in new radio (NR). The base station in NR may also be referred to as a transmission reception point (TRP) or a next generation NodeB (gNB). Alternatively, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (Evolutional NodeB, eNB or eNodeB) in a long term evolution (LTE) system, or may be a gNB in a future 5G (5th generation) network. The network device in the embodiments of the disclosure may alternatively include a device that is deployed in a radio access network and that can perform wireless communication with a terminal. For example, the network device may be a radio controller in a cloud radio access network (CRAN) scenario. Alternatively, the network device may be a relay station, an access point, a network device in a future 5G network, a network device in a future evolved public land mobile network (PLMN), or the like, for example, an evolved NodeB (eNB), a radio network controller (RNC), a NodeB (NB), a base station controller (BSC), a base transceiver station (BTS), a home network device (e.g., a home evolved NodeB or a home NodeB, HNB), or a baseband unit (BBU). In the embodiments of the disclosure, an apparatus that implements a function of the network device may be a network device, or may be an apparatus that supports the network device in implementing the function, such as a chip, a circuit, or another apparatus. In the embodiments of the disclosure, an example in which the apparatus that implements the function of the network device is the network device is used to describe the technical solutions provided in the embodiments of the disclosure.

The terminal device in the embodiments of the disclosure may also be referred to as a terminal, and may be a device having a wireless transceiver function. The terminal device may be deployed on land, and includes an indoor device, an outdoor device, a handheld device, a wearable device, an in-vehicle device, or a vehicle-mounted device. Alternatively, the terminal device may be deployed on a water surface (e.g., on a ship), or may be deployed in the air (e.g., on an aircraft, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of the disclosure, an apparatus that implements a function of the terminal may be a terminal, or may be an apparatus that supports the terminal in implementing the function, such as a chip, a circuit, or another apparatus. In the embodiments of the disclosure, an example in which the apparatus that implements the function of the terminal is the terminal is used to describe the technical solutions provided in the embodiments of the disclosure.

Usually, the terminal device needs to be scheduled by the network device regardless of whether the terminal device is to receive downlink data or send uplink data, and the network device may schedule the terminal device through a PDCCH. For example, the PDCCH may carry downlink scheduling information, so that the terminal device receives a physical downlink shared channel (PDSCH). Alternatively, the PDCCH may be used to send uplink scheduling information, so that the terminal device sends a physical uplink shared channel (PUSCH). Before successfully receiving the PDCCH, the terminal device needs to monitor a set of candidate PDCCHs. To be specific, the terminal device attempts to decode each PDCCH in the set based on a DCI format for monitoring. If the terminal device successfully decodes a PDCCH in search space in a monitoring process, it means that the terminal device successfully receives the PDCCH. It should be noted that the search space is used by the terminal device to determine the set of the candidate PDCCHs. For each piece of search space, the network device may configure parameters of the search space. The parameters include a search space index, an associated control resource set, a PDCCH monitoring period, PDCCH monitoring duration in each PDCCH monitoring period, a quantity of candidate PDCCHs at each CCE aggregation level, a DCI format for monitoring, and the like. The terminal device may determine the set of the to-be-monitored candidate PDCCHs based on the parameters of the search space.

Figure 2:
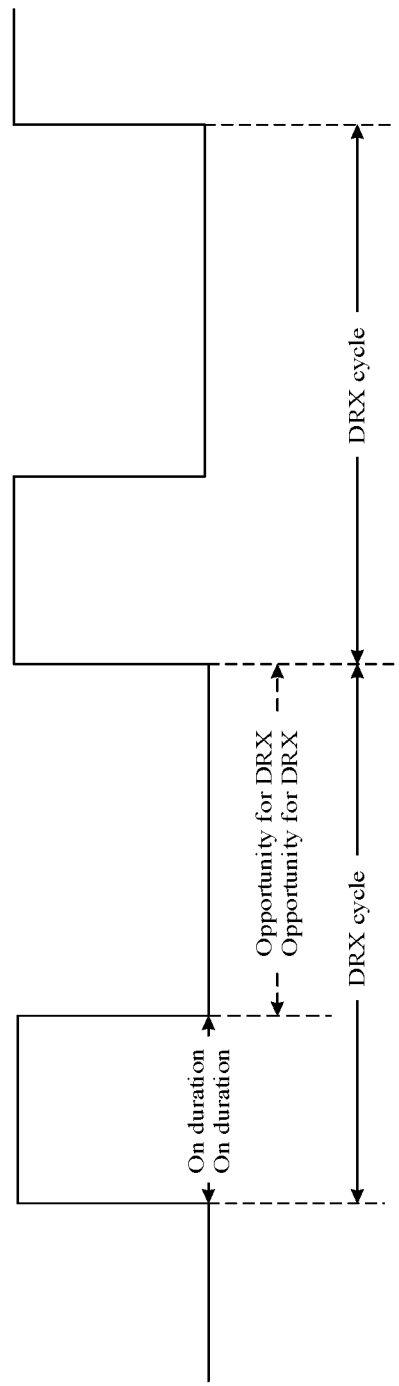
FIG. 2 is a schematic diagram of a DRX cycle in the prior art.

DRX (discontinuous reception) is further defined in LTE and NR to reduce power consumption of the terminal device for performing PDCCH monitoring. DRX in a connected mode may also be referred to as C-DRX (connected discontinuous reception). A basic principle of DRX is as follows: A network device configures a DRX parameter for a terminal device in a connected mode. The DRX parameter may include a DRX cycle. Referring to FIG. 2, the DRX cycle includes "On Duration" and "Opportunity for DRX". "On Duration" may be referred to as on duration, and "Opportunity for DRX" may be referred to as an opportunity for DRX. Within "On Duration", the terminal device monitors a PDCCH. Within an "Opportunity for DRX" time period, the terminal device may not monitor a PDCCH to reduce power consumption.

Alternatively, the network device sends indication information to the terminal device, to reduce, by using the indication information, power consumption of the terminal device for performing PDCCH monitoring. The indication information is used to indicate that the terminal device does not need to monitor a PDCCH in the following several slots. Alternatively, the network device sends indication information before on duration, to indicate that the terminal device needs to monitor a PDCCH or does not need to monitor a PDCCH within the on duration existing after the indication information is sent.

In the foregoing two solutions for reducing power consumption of the terminal device, the terminal device needs to monitor and attempt to decode all PDCCHs in search space configured by the network device for the terminal device. In this case, power consumption cannot be ignored. For example, in NR, a maximum of 10 pieces of search space may be configured for a terminal when the terminal performs communication in a currently configured BWP (Bandwidth part). Within on duration in a DRX cycle, the UE needs to monitor and attempt to decode all PDCCHs included in the 10 pieces of search space, resulting in very high power consumption.

An embodiment of the disclosure provides a monitoring method. A terminal device obtains a first search space configuration and a second search space configuration. The first search space configuration includes a first search space set, the second search space configuration includes a second search space set, and the first search space set is different from the second search space set. Alternatively, the first search space configuration includes a first search space parameter, the second search space configuration includes a second search space parameter, and the first search space parameter is different from the second search space parameter. Further, if a first condition is met, the terminal device monitors a physical downlink control channel PDCCH based on the first search space configuration. The first condition includes: a first timer is not in a running state. If a second condition is met, the terminal device monitors a PDCCH based on the second search space configuration. The second condition includes: the first timer is in a running state. In this embodiment of the disclosure, the first search space configuration and the second search space configuration may be different search space sets, and the first search space set and/or the second search space set may not include all pieces of search space of the terminal device. In this case, the terminal device needs to monitor PDCCHs in only some pieces of search space of the terminal device. This greatly reduces power consumption of the terminal device. Certainly, the first search space configuration and the second search space configuration may be different search space parameters. In this embodiment of the disclosure, a resource used by the terminal device to monitor the PDCCH may be adjusted by configuring different search space parameters for the terminal device, to reduce power consumption of the terminal device.

Figure 3:
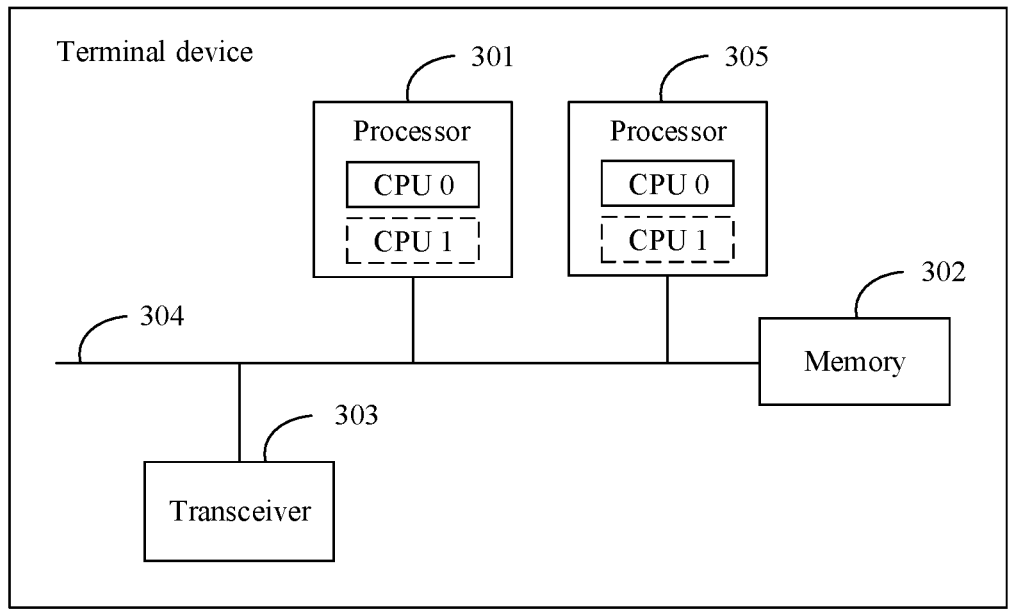
FIG. 3 is a structural block diagram of a terminal device according to an embodiment of the disclosure.

An embodiment of the disclosure provides a terminal device 30. As shown in FIG. 3, the terminal device 30 includes the embodiments of the disclosure. A monitoring method and a communication method that are provided in the embodiments of the disclosure may be applied to the terminal device shown in FIG. 3. As shown in FIG. 3, the terminal device may include at least one processor 301, a memory 302, a transceiver 303, and a communications bus 304.

The following describes components of the terminal device in detail with reference to FIG. 3.

The processor 301 is a control center of the terminal device, and may be a processor, or may be a collective term for a plurality of processing elements. For example, the processor 301 is a central processing unit (CPU), or may be an application-specific integrated circuit (ASIC), or may be configured as one or more integrated circuits implementing the embodiments of this application, for example, one or more microprocessors (digital signal processor, DSP) or one or more field programmable gate arrays (FPGA).

The processor 301 may run or execute a software program stored in the memory 302, and invoke data stored in the memory 302, to perform various functions of the terminal device.

In specific implementation, in an embodiment, the processor 301 may include one or more CPUs, for example, a CPU 0 and a CPU 1 that are shown in FIG. 3.

In specific implementation, in an embodiment, the terminal device may include a plurality of processors, for example, the processor 301 and a processor 305 shown in FIG. 3. Each of the processors may be a single-core (single-CPU) processor or may be a multi-core (multi-CPU) processor. The processor herein may refer to one or more terminal devices, circuits, and/or processing cores configured to process data (e.g., a computer program instruction).

The memory 302 may be a read-only memory (ROM) or another type of static storage terminal device capable of storing static information and instructions, or a random access memory (RAM) or another type of dynamic storage terminal device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage terminal device, or any other medium capable of carrying or storing expected program code in a form of instructions or data structures and capable of being accessed by a computer, but is not limited thereto. The memory 302 may exist independently, and is connected to the processor 301 through the communications bus 304. The memory 302 may alternatively be integrated with the processor 301.

The memory 302 is configured to store a software program for performing the solutions of the disclosure, and the processor 301 controls execution of the software program.

The transceiver 303 is any terminal device of a transceiver type, and is used for communication with another terminal device. Certainly, the transceiver 303 may further be configured to communicate with a communications network, such as the Ethernet, a radio access network (RAN), or a wireless local area network (WLAN). The transceiver 303 may include a receiving unit for implementing a receiving function and a sending unit for implementing a sending function.

The communications bus 304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

A terminal device structure shown in FIG. 3 does not constitute a limitation on the terminal device. The terminal device may include more or fewer components than those shown in the figure, or combine some components, or have a different component arrangement.

Figure 4:
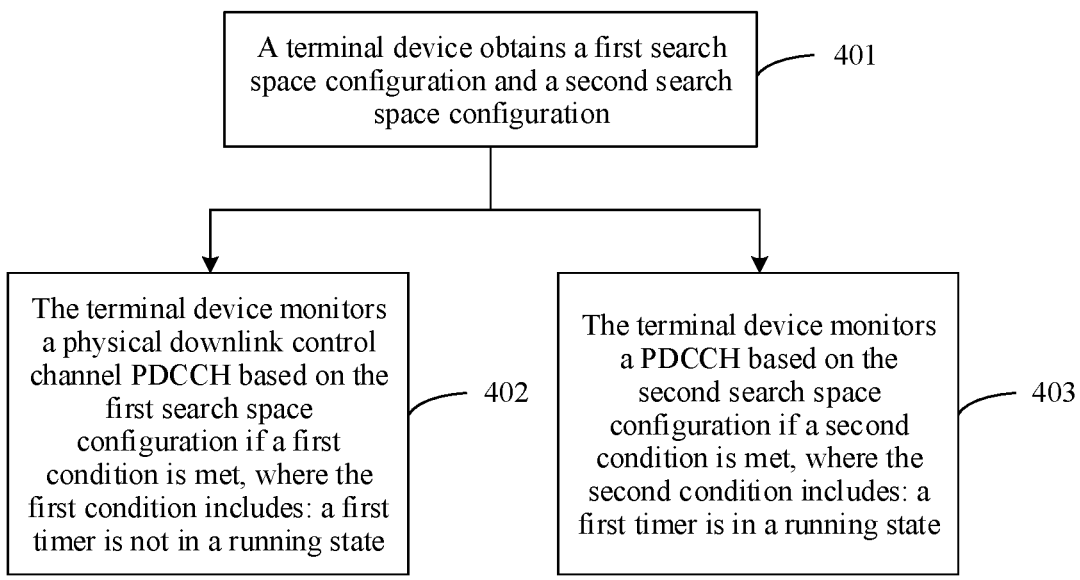
FIG. 4 is a schematic flowchart of a monitoring method according to an embodiment of the disclosure.

An embodiment of the disclosure provides a monitoring method. As shown in FIG. 4, the method includes the following steps.

Step 401: A terminal device obtains a first search space configuration and a second search space configuration.

In specific implementation, the terminal device may obtain the first search space configuration and the second search space configuration through signaling delivered by a network device, or may obtain the first search space configuration and the second search space configuration that are preconfigured. Specifically, the network device may notify the first search space configuration and the second search space configuration through two pieces of signaling. For example, the terminal device receives first information sent by the network device, where the first information includes or indicates the first search space configuration; and the terminal device receives second information sent by the network device, where the second information includes or indicates the second search space configuration. In other words, the network device encapsulates the first information and the second information into two pieces of signaling, and separately delivers the two pieces of signaling to the terminal device. Certainly, the network device may alternatively encapsulate the first information and the second information into one piece of signaling, and deliver the piece of signaling to the terminal device. Alternatively, the network device may notify the terminal device of only one of the first search space configuration and the second search space configuration, and the terminal device may derive the second search space configuration based on the first search space configuration, or derive the first search space configuration based on the second search space configuration. It should be noted that a search space configuration may be a search space set, namely, a set including one or more pieces of search space. The terminal device may determine, based on the search space, a set of PDCCHs that need to be monitored. Alternatively, a search space configuration may be a search space parameter, for example, one or more of a PDCCH monitoring period, PDCCH monitoring duration in each PDCCH monitoring period, a quantity of candidate PDCCHs, a CCE aggregation level, or an associated control resource set. The terminal device may determine, based on the search space parameter, a resource to be used for a PDCCH that needs to be monitored.

In some embodiments, the first search space configuration includes a first search space set, the second search space configuration includes a second search space set, and the first search space set is different from the second search space set.

In specific implementation, the first search space set may be a subset of the second search space set. For example, the second search space set includes search space 1, search space 2, search space 3, search space 4, and search space 5, and the first search space set includes the search space 1 and the search space 2.

Optionally, an intersection set of the first search space set and the second search space set may be an empty set. In other words, the first search space set and the second search space set include no same search space. For example, the second search space set includes search space 3, search space 4, and search space 5, and the first search space set includes search space 1 and search space 2.

Optionally, an intersection set of the first search space set and the second search space set may be a non-empty set. In other words, the first search space set and the second search space set include same search space. For example, the second search space set includes search space 3, search space 4, and search space 5, and the first search space set includes search space 2 and the search space 3.

The network device may configure a BWP (that is, a part of system bandwidth) for the terminal device, and the terminal device may communicate with the network device in the BWP configured by the network device. The BWP may be divided into an uplink BWP and a downlink BWP. The terminal device sends uplink data to the network device in the uplink BWP, and receives, in the downlink BWP, downlink data such as a PDCCH sent by the network device. Usually, for each downlink BWP of a serving cell of the terminal device, a maximum of 10 pieces of search space may be configured for the terminal device. For each piece of search space, one or more of the following search space parameters: a search space index, an associated control resource set, a PDCCH monitoring period, PDCCH monitoring duration in each PDCCH monitoring period, a quantity of candidate PDCCHs at each control channel element (CCE) aggregation level, and a DCI format for monitoring, may be configured for UE. A time unit of the PDCCH monitoring period and the PDCCH monitoring duration is a slot. The terminal device may determine, based on the control resource set and the search space, a resource to be used for a candidate PDCCH that needs to be monitored. In addition, the network device may configure search space for each terminal device. For example, a UE specific (specific to UE) PDCCH parameter is configured for the terminal device to specifically configure, for the terminal device, search space for monitoring a PDCCH, and the search space in which the terminal device may monitor a PDCCH is one or more pieces of search space in the UE specific PDCCH parameter of the terminal device. Alternatively, the network device may configure search space for each cell. For example, a cell specific (specific to a cell) PDCCH parameter is configured for the terminal device to configure, for the terminal device, search space for monitoring a PDCCH, and the cell specific PDCCH parameter configured for the terminal device is the same as a cell specific PDCCH parameter configured for another terminal device in a serving cell in which the terminal device is located.

In specific implementation, search space in the first search space set and the second search space set may be one or more pieces of search space in the UE specific PDCCH parameter.

Optionally, the first search space set includes search space in the cell specific PDCCH parameter and one or more pieces of search space in the UE specific PDCCH parameter, and the second search space set includes all pieces of search space configured for the terminal device. For example, the cell specific PDCCH parameter configured for the terminal device includes search space 1 and search space 2, and the UE specific PDCCH parameter configured for the terminal device includes search space 3, search space 4, and search space 5. The first search space set includes the search space 1, the search space 2, and the search space 3, and the second search space set includes the search space 1, the search space 2, the search space 3, the search space 4, and the search space 5.

Optionally, the first search space set and the second search space set each include search space in the cell specific PDCCH parameter and one or more pieces of search space in the UE specific PDCCH parameter. In some embodiments, the first search space set and the second search space set include same search space in the cell specific PDCCH parameter, and the first search space set and the second search space set include different pieces of search space in the UE specific PDCCH parameter. For example, the cell specific PDCCH parameter includes search space 1 and search space 2, and the UE specific PDCCH parameter includes search space 3, search space 4, and search space 5. If all pieces of search space in the UE specific PDCCH parameter that are included in the first search space set are different from those in the UE specific PDCCH parameter that are included in the second search space set, for example, the first search space includes the search space 1, the search space 2, and the search space 3, and the second group of search space includes the search space 1, the search space 2, the search space 4, and the search space 5. If all pieces of search space in the UE specific PDCCH parameter that are included in the first search space set are different from those in the UE specific PDCCH parameter that are included in the second search space set, for example, the first group of search space includes the search space 1, the search space 2, the search space 3, and the search space 4, and the second group of search space includes the search space 1, the search space 2, the search space 4, and the search space 5.

Optionally, the first search space set includes search space in the cell specific PDCCH parameter, and the second search space set includes the search space in the cell specific PDCCH parameter and search space in the UE specific PDCCH parameter.

In some embodiments, the first search space set may be a set including default search space of the terminal device. The network device may configure one or more pieces of default search space for the terminal device. The default search space may be a subset of all pieces of search space configured by the network device for the terminal device.

In some embodiments, a control resource set associated with the first search space set is a default control resource set of the UE. It should be noted that the network device may configure one or more control resource sets for the terminal device, and the "one or more control resource sets" config- ured by the network device for the terminal device may be referred to as a default control resource set of the terminal device.

In some embodiments, a resource for monitoring a PDCCH may be adjusted by using different search space parameters in same search space. In this embodiment of the disclosure, the first search space configuration includes a first search space parameter, the second search space configuration includes a second search space parameter, and the first search space parameter is different from the second search space parameter. In other words, the terminal device may monitor a PDCCH based on different search space parameters. For example, the terminal device monitors a PDCCH based on different PDCCH monitoring periods, the terminal device monitors a PDCCH based on different PDCCH monitoring duration, or the terminal device monitors a PDCCH based on different quantities of candidate PDCCHs. The search space parameter may include one or more of a PDCCH monitoring period, PDCCH monitoring duration in each PDCCH monitoring period, a quantity of candidate PDCCHs, a CCE aggregation level, or an associated control resource set. Optionally, the quantity of candidate PDCCHs may be a quantity of candidate PDCCHs at each CCE aggregation level.

In some embodiments, the second search space parameter may be configured for the terminal device, and the terminal device may determine the first search space parameter based on the second search space parameter. In specific implementation, the terminal device may determine the first search space parameter based on the second search space parameter and a scale factor. The scale factor may be configured by the network device, or may be predefined. For example, the first search space parameter includes a first PDCCH monitoring period, and the second search space parameter includes a second PDCCH monitoring period. The network device configures the second PDCCH monitoring period for the terminal device, and the terminal device determines that the first PDCCH monitoring period is a product of the second PDCCH monitoring period and the scale factor.

In some embodiments, the first search space parameter may be a default search space parameter. The default search space parameter may be a search space parameter preconfigured by the network device for the terminal device. For example, the network device configures a PDCCH monitoring period or a quantity of candidate PDCCHs for the terminal device.

In some embodiments, an associated control resource set in the first search space set is a default control resource set of the UE.

In specific implementation, the first search space parameter and the second search space parameter may be indicated in a search space IE (Information element). For example, the search space parameter may be a monitoring period and an offset parameter. The first search space parameter and the second search space parameter are added to the search space IE. The first search space parameter and the second search space parameter include different monitoring periods, the first search space parameter and the second search space parameter include different offset parameters, and the first search space parameter and the second search space parameter indicate different resources for monitoring a PDCCH. The terminal device may monitor a PDCCH based on different resources.

If a first condition is met, step 402 is performed. If a second condition is met, step 403 is performed.

Step 402: The terminal device monitors a physical downlink control channel PDCCH based on the first search space configuration if the first condition is met, where the first condition includes: a first timer is not in a running state.

Step 403: The terminal device monitors a PDCCH based on the second search space configuration if the second condition is met, where the second condition includes: the first timer is in a running state.

In specific implementation, duration of the first timer may be configured by the network device through RRC signaling. In some embodiments, the duration of the timer is less than duration of an inactivity timer (drx-InactivityTimer). Certainly, in this embodiment of the disclosure, the first timer may alternatively be the drx-InactivityTimer, and is used to determine a time length of monitoring a PDCCH by the terminal device after the terminal device successfully decodes a PDCCH for scheduling new transmission.

Figure 4A:
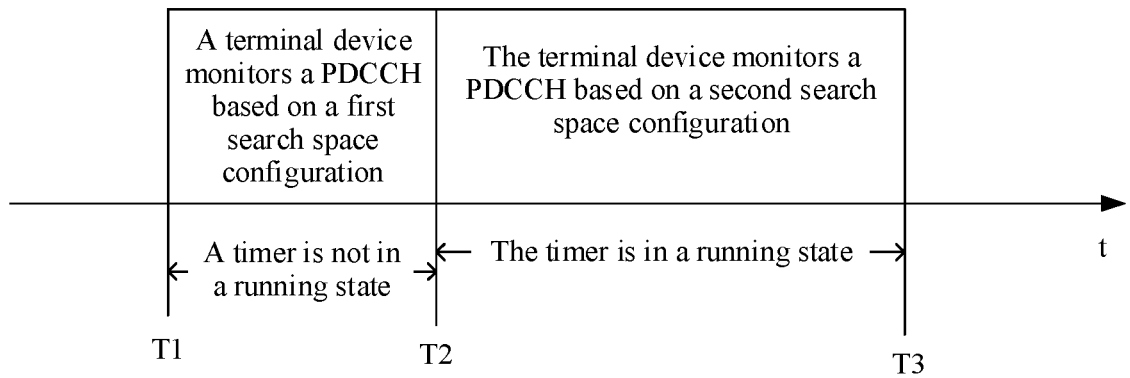
FIG. 4a is a schematic diagram of a monitoring method according to an embodiment of the disclosure.

For example, the first timer is a timer configured by the network device through RRC signaling. Referring to FIG. 4a, the timer is not started at a moment T1 at the beginning, and the timer is started at a moment T2. Therefore, the timer is not in a running state from the moment T1 to the moment T2, and the terminal device monitors the PDCCH based on the first search space configuration. The timer is in a running state from the moment T2 to a moment T3, and the terminal device monitors the PDCCH based on the second search space configuration.

It should be noted that, once various types of timers described in this embodiment of the disclosure are started, the timers are in a running state until the timers are stopped or expire. If the timers are not started, the timers are not in a running state. If the timer is not in a running state, the timer may be started. If the timer is in a running state, the timer may be restarted. A value of the timer is an initial value of the timer when the timer is started or restarted. A time length of the timer may be understood as a time length in which the timer continuously runs from a starting or restarting moment to an expiration moment.

This embodiment of the disclosure further provides other possible implementations of the first condition in step 402. The first condition may specifically include the following four possible cases.

(1) In addition to including that the first timer is not in a running state, the first condition further includes that a third timer is in a running state.

It should be noted that the third timer is used to determine a time length of monitoring a PDCCH by the terminal device in one discontinuous reception DRX cycle. For example, the third timer is an on duration timer, an onDurationTimer, or a drx-onDurationTimer. In other words, if the first timer is not in a running state and the third timer is in a running state, the terminal device monitors the PDCCH based on the first search space configuration. The third timer may be started at a start moment of the DRX cycle. Alternatively, the third timer is started at a start moment of on duration (On Duration) in the DRX cycle, and a time length of the third timer is a length of the on duration.

(2) In some embodiments, in addition to including that the first timer is not in a running state, the first condition may further include that the terminal device is within on duration in a DRX cycle. In other words, if the first timer is not in a running state and the terminal device is within the on duration in the DRX cycle, the terminal device monitors the physical downlink control channel PDCCH based on the first search space configuration.

(3) In some embodiments, in addition to including that the first timer is not in a running state, the first condition further includes one or more of the following cases: a downlink retransmission timer (such as a drx-Retransmission TimerDL or a drx-RetransmissionTimer) is not in a running state; an uplink retransmission timer (such as a drx-Retransmission TimerUL or a drx-ULRetransmissionTimer) is not in a running state; a contention resolution timer (such as an ra-ContentionResolutionTimer or a mac-ContentionResolutionTimer) is not in a running state; a scheduling request sent by the terminal device is not in a pending state; and the terminal device is not in a state in which "the terminal device receives, after successfully receiving a random access response RAR, no PDCCH used to indicate new transmission", where the PDCCH used to indicate new transmission is scrambled by using a cell radio network temporary identifier C-RNTI, the RAR is a response to a target random access preamble, and the target random access preamble is not a contention-based random access preamble.

For example, in some embodiments, if the first timer is not in a running state and the downlink retransmission timer is not in a running state, the terminal device monitors the physical downlink control channel PDCCH based on the first search space configuration. In some other embodiments, if the first timer is not in a running state, the downlink retransmission timer is not in a running state, and the uplink retransmission timer is not in a running state, the terminal device monitors the physical downlink control channel PDCCH based on the first search space configuration. In some other embodiments, if the first timer is not in a running state, a third timer is in a running state, and the downlink retransmission timer is not in a running state, the terminal device monitors the physical downlink control channel PDCCH based on the first search space configuration.

The uplink retransmission timer is used to determine a time length of monitoring a PDCCH used to indicate uplink retransmission, and the downlink retransmission timer is used to determine a time length of monitoring a PDCCH used to indicate downlink retransmission. The contention resolution timer is used to determine a time length of monitoring, by the terminal device after the terminal device sends a message 3 in a random access process, a PDCCH used to indicate a message 4.

(4) In some embodiments, the first condition is that the terminal device is between a first moment and a second moment. The second moment is a third moment, and the third moment is a moment at which the terminal device receives the $N^{th}$ PDCCH after the first moment. Alternatively, the second moment is a moment later than the third moment by first duration. N is an integer greater than or equal to 1, and a length of the first duration is greater than 0. The terminal device monitors the PDCCH based on the first search space configuration if the first condition is met. The second condition is that the terminal device is after the second moment. The terminal device monitors the PDCCH based on the second search space configuration if the second condition is met. In some embodiments, the first moment may be a start moment of DRX on duration. In some embodiments, if an inactivity timer expires within on duration in a DRX cycle, the first moment is a moment at which the inactivity timer expires.

In some embodiments, the terminal device monitors the PDCCH based on the second search space configuration if one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

In specific implementation, if the downlink retransmission timer is in a running state, the terminal device monitors the PDCCH based on the second search space configuration.

If the uplink retransmission timer is in a running state, the terminal device monitors the PDCCH based on the second search space configuration.

If the contention resolution timer is in a running state, the terminal device monitors the PDCCH based on the second search space configuration.

If the scheduling request sent by the terminal device is in a pending state, the terminal device monitors the PDCCH based on the second search space configuration.

If the terminal device receives, after successfully receiving the random access response RAR, no PDCCH used to indicate new transmission, the terminal device monitors the PDCCH based on the second search space configuration.

If the downlink retransmission timer is in a running state or the uplink retransmission timer is in a running state, the terminal device monitors the PDCCH based on the second search space configuration.

If the downlink retransmission timer is in a running state or the contention resolution timer is in a running state, the terminal device monitors the PDCCH based on the second search space configuration.

If the downlink retransmission timer is in a running state or the scheduling request sent by the terminal device is in a pending state, the terminal device monitors the PDCCH based on the second search space configuration.

If the downlink retransmission timer is in a running state or the terminal device receives, after successfully receiving the random access response RAR, no PDCCH used to indicate new transmission, the terminal device monitors the PDCCH based on the second search space configuration.

If the uplink retransmission timer is in a running state or the contention resolution timer is in a running state, the terminal device monitors the PDCCH based on the second search space configuration.

If the uplink retransmission timer is in a running state or the scheduling request sent by the terminal device is in a pending state, the terminal device monitors the PDCCH based on the second search space configuration.

If the uplink retransmission timer is in a running state or the terminal device receives, after successfully receiving the random access response RAR, no PDCCH used to indicate new transmission, the terminal device monitors the PDCCH based on the second search space configuration.

If the contention resolution timer is in a running state or the scheduling request sent by the terminal device is in a pending state, the terminal device monitors the PDCCH based on the second search space configuration.

If the contention resolution timer is in a running state or the terminal device receives, after successfully receiving the random access response RAR, no PDCCH used to indicate new transmission, the terminal device monitors the PDCCH based on the second search space configuration.

If the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the uplink retransmission timer is in a running state or the contention resolution timer is in a running state, the terminal device monitors the PDCCH based on the second search space configuration.

If the downlink retransmission timer is in a running state or the uplink retransmission timer is in a running state or the scheduling request sent by the terminal device is in a pending state, the terminal device monitors the PDCCH based on the second search space configuration.

If the downlink retransmission timer is in a running state or the uplink retransmission timer is in a running state or the terminal device receives, after successfully receiving the random access response RAR, no PDCCH used to indicate new transmission, the terminal device monitors the PDCCH based on the second search space configuration.

If the uplink retransmission timer is in a running state or the contention resolution timer is in a running state or the scheduling request sent by the terminal device is in a pending state, the terminal device monitors the PDCCH based on the second search space configuration.

If the uplink retransmission timer is in a running state or the contention resolution timer is in a running state or the terminal device receives, after successfully receiving the random access response RAR, no PDCCH used to indicate new transmission, the terminal device monitors the PDCCH based on the second search space configuration.

If the contention resolution timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the contention resolution timer is in a running state or the scheduling request sent by the terminal device is in a pending state, the terminal device monitors the PDCCH based on the second search space configuration.

If the downlink retransmission timer is in a running state or the contention resolution timer is in a running state or the terminal device receives, after successfully receiving the random access response RAR, no PDCCH used to indicate new transmission, the terminal device monitors the PDCCH based on the second search space configuration.

If the uplink retransmission timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the uplink retransmission timer is in a running state or the contention resolution timer is in a running state or the scheduling request sent by the terminal device is in a pending state, the terminal device monitors the PDCCH based on the second search space configuration.

If the downlink retransmission timer is in a running state or the uplink retransmission timer is in a running state or the contention resolution timer is in a running state or the terminal device receives, after successfully receiving the random access response RAR, no PDCCH used to indicate new transmission, the terminal device monitors the PDCCH based on the second search space configuration.

If the downlink retransmission timer is in a running state or the uplink retransmission timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the uplink retransmission timer is in a running state or the contention resolution timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the contention resolution timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

If the downlink retransmission timer is in a running state or the uplink retransmission timer is in a running state or the contention resolution timer is in a running state or the scheduling request sent by the terminal device is in a pending state or the terminal device receives, after successfully receiving the random access response RAR, no PDCCH used to indicate new transmission, the terminal device monitors the PDCCH based on the second search space configuration.

In addition, the PDCCH monitored by the terminal device may be a PDCCH scrambled by using a cell radio network temporary identifier (C-RNTI), a configured scheduling radio network temporary identifier (Configured Scheduling RNTI, CS-RNTI), an interruption radio network temporary identifier (Interruption RNTI, INT-RNTI), a slot format indication radio network temporary identifier (Slot Format Indication RNTI, SFI-RNTI), a semi-persistent channel state information radio network temporary identifier (Semi-Persistent CSI RNTI, SP-CSI-RNTI), a transmit power control radio network temporary identifier (Transmit Power Control RNTI, TPC-PUCCH-RNTI), a transmit power control physical uplink shared channel radio network temporary identifier (Transmit Power Control Physical Uplink Shared Channel RNTI, TPC-PUSCH-RNTI), or a transmit power control sounding reference signal radio network temporary identifier (Transmit Power Control Sounding Reference Signal RNTI, TPC-SRS-RNTI).

In specific implementation, the terminal device monitors the PDCCH to determine whether the PDCCH is received. It should be noted that, that the terminal device receives the PDCCH may also be considered as that the terminal device monitors the PDCCH. The terminal device may start or restart the first timer in the following scenarios: The first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the terminal device starts or restarts the first timer if a second timer is started or restarted, where the second timer is used to determine a time length of monitoring a PDCCH by the terminal device after the terminal device receives a PDCCH used to indicate new transmission. For example, the second timer is a drx-InactivityTimer. The PDCCH used to indicate data transmission may be a PDCCH used to indicate uplink transmission, or may be a PDCCH used to indicate downlink transmission. Alternatively, if the terminal device receives indication information sent by the network device, the terminal device starts or restarts the first timer. The indication information may be transmitted through downlink control information (DCI), or may be transmitted through a medium access control control element (MAC CE).

In some embodiments, the terminal device may further determine, based on a result of determining whether the first condition or the second condition is met, a MIMO layer quantity to be used to receive a PDSCH. For example, if the first condition is met, a multiple-input multiple-output MIMO layer quantity to be used by the terminal device to receive a PDSCH indicated by the PDCCH is a first MIMO layer quantity, or if the second condition is met, a MIMO layer quantity to be used by the terminal device to receive a PDSCH indicated by the PDCCH is a second MIMO layer quantity. The first MIMO layer quantity is different from the second MIMO layer quantity, the first MIMO may be a maximum MIMO layer quantity, and the second MIMO layer quantity is less than the first MIMO layer quantity.

It should be noted that the terminal device may monitor a PDCCH in a secondary cell by using the monitoring method in step 401 to step 403. Alternatively, the terminal device may monitor a PDCCH in a default BWP or an initial BWP by using the monitoring method in step 401 to step 403. Optionally, the terminal device may alternatively use the method based on a configuration of the network device. For example, if the network device configures the terminal device to use a power saving mode, the network device sends indication information to the terminal device, to indicate the terminal device to use the power saving mode. After receiving the indication information, the terminal device monitors a PDCCH by using the monitoring method in step 401 to step 403. Before the network device configures the terminal device to use the power saving mode, the terminal device may send indication information to the network device, to indicate that the terminal device expects to use the power saving mode, or to indicate that power of the terminal device is relatively low.

This embodiment of the disclosure further provides a method for configuring the first search space set and the second search space set. There are specifically the following three configuration methods: a first configuration method to a third configuration method.

In the first configuration method, it is indicated, in an IE (Information element) of search space, that the search space belongs to the first search space set, or the search space belongs to the second search space set. Specifically, there may be the following three possible cases.

(1) The search space IE includes one piece of indication information, and the indication information indicates whether the search space belongs to the first search space set or the second search space set. The indication information may have two values. One value indicates that the search space belongs to the first search space set, and the other value indicates that the search space belongs to the second search space set. For example, SearchSpace IE includes searchSpaceGroup, and available values of searchSpaceGroup include "first" and "second", where "first" indicates that the search space belongs to the first search space set, and "second" indicates that the search space belongs to the second search space set. A specific implementation in the standard may be as follows:

```
SearchSpace ::=   SEQUENCE {
    searchSpaceGroup
    ENUMERATED {first, second}
}
```

Alternatively, the indication information may have three values. One value indicates that the search space belongs to the first search space set, one value indicates that the search space belongs to the second search space set, and the other value indicates that the search space belongs to both the first search space set and the second search space set. For example, SearchSpace IE includes searchSpaceGroup, and available values of searchSpaceGroup include "first", "second", and "both", where "first" indicates that the search space belongs to the first search space set, "second" indicates that the search space belongs to the second search space set, and "both" indicates that the search space belongs to both the first search space set and the second search space set. A specific implementation in the standard may be as follows:

```
SearchSpace ::=   SEQUENCE {
    searchSpaceGroup
    ENUMERATED {first, second, both}
}
```

(2) The search space IE includes one piece of indication information, and the indication information indicates whether the search space belongs to the first search space set. The indication information has two values. One value indicates that the search space belongs to the first search space set, and the other value indicates that the search does not belong to the first search space set. For example, SearchSpace IE includes searchSpaceDefault, and available values of searchSpaceDefault include "true" and "false", where "true" indicates that the search space belongs to the first search space set, and "false" indicates that the search space does not belong to the first search space set. A specific implementation in the standard may be as follows:

```
SearchSpace ::=   SEQUENCE {
    searchSpaceDefault
    ENUMERATED {true, false}
}
```

Optionally, if the search space does not belong to the first search space set, the search space belongs to the second search space set. It may be understood that, if the search space belongs to the first search space set, the search space may also belong to the second search space set.

(3) The search space IE includes one piece of indication information, and the indication information indicates whether the search space belongs to the second search space set. The indication information has two values. One value indicates that the search space belongs to the second search space set, and the other value indicates that the search space does not belong to the second search space set. For example, SearchSpace IE includes searchSpaceSecondGroup, and available values of searchSpaceSecondGroup include "true" and "false", where "true" indicates that the search space belongs to the second search space set, and "false" indicates that the search space does not belong to the second search space set. A specific implementation in the standard may be as follows:

```
SearchSpace ::=   SEQUENCE {
    searchSpaceFirstGroup
    ENUMERATED {true, false}
}
```

Optionally, if the search space does not belong to the second search space set, the search space belongs to the first search space set.

In the second configuration method, configuration signaling includes indication information for indicating that search space belongs to the first search space set. For example, PDCCH-Config IE includes indication information DefaultSearchSpace for indicating that the search space belongs to the first search space set, and DefaultSearchSpace includes one or more search space IEs. Search space corresponding to these search space IEs belongs to the first search space set. A specific implementation in the standard may be as follows:

```
PDCCH-Config ::=              SEQUENCE {
    DefaultSearchSpace        SearchSpace
}
```

Alternatively, a specific implementation in the standard may be as follows, where N is greater than or equal to 1.

```
PDCCH-Config ::=         SEQUENCE {
    DefaultSearchSpace   SEQUENCE(SIZE (1..N)) OF SearchSpace
}
```

Optionally, search space that is not indicated to belonging to the first search space set belongs to the second search space set.

In the third configuration method, indication information of the first search space set may be a search space index, and the search space index is used to indicate search space that belongs to the first search space set. For example, PDCCH-Config IE includes indication information DefaultSearchSpace of the second group of search space, and DefaultSearchSpace includes one or more search space indexes. Search space corresponding to these indexes belongs to the first search space set. A specific implementation in the standard may be as follows:

```
PDCCH-Config ::=              SEQUENCE {
    DefaultSearchSpace        SearchSpaceId
}
```

Alternatively, a specific implementation in the standard may be as follows, where N is greater than or equal to 1.

```
PDCCH-Config ::=         SEQUENCE {
    DefaultSearchSpace   SEQUENCE(SIZE (1..N)) OF SearchSpaceId
}
```

Optionally, search space that is not indicated to belonging to the first search space set belongs to the second search space set.

In addition, this embodiment of the disclosure further provides a method for configuring the first search space parameter and the second search space parameter. There are specifically the following two configuration methods.

In a first configuration method, the first search space parameter and the second search space parameter are indicated in a search space IE (Information element). For example, the first search space parameter and the second search space parameter each include a PDCCH monitoring period. SearchSpace IE includes monitoringSlotPeriodicity-AndOffset1 and monitoringSlotPeriodicity AndOffset2. Herein, monitoringSlotPeriodicity AndOffset1 indicates a first PDCCH monitoring period, and monitoringSlotPeriodicity AndOffset2 indicates a second PDCCH monitoring period. A specific implementation in the standard may be as follows:

```
SearchSpace ::=                              SEQUENCE {
    monitoringSlotPeriodicityAndOffset1      CHOICE {
        sl1
NULL,
        sl2
INTEGER (0..1),
        ...
    }
    monitoringSlotPeriodicityAndOffset2      CHOICE {
        sl1
NULL,
        sl2
INTEGER (0..1),
        ...
    }
}
```

In a second configuration method, the second search space parameter and a scale factor are indicated in a search space IE (Information element). The first search space parameter may be determined based on the second search space parameter and the scale factor. For example, the first search space parameter and the second search space parameter each include a PDCCH monitoring period. SearchSpace IE includes monitoringSlotPeriodicity AndOffset, used to indicate a second PDCCH monitoring period. SearchSpace IE further includes scale, used to indicate the scale factor. The terminal device may determine a first PDCCH monitoring period based on the second PDCCH monitoring period and the scale factor. A specific implementation in the standard may be as follows:

```
SearchSpace ::=                             SEQUENCE {
    monitoringSlotPeriodicityAndOffset      CHOICE {
        sl1
NULL,
        sl2
INTEGER (0..1),
        ...
    }
    scale                                   ENUMERATED {0.5, 0.25}
}
```

Figure 5:
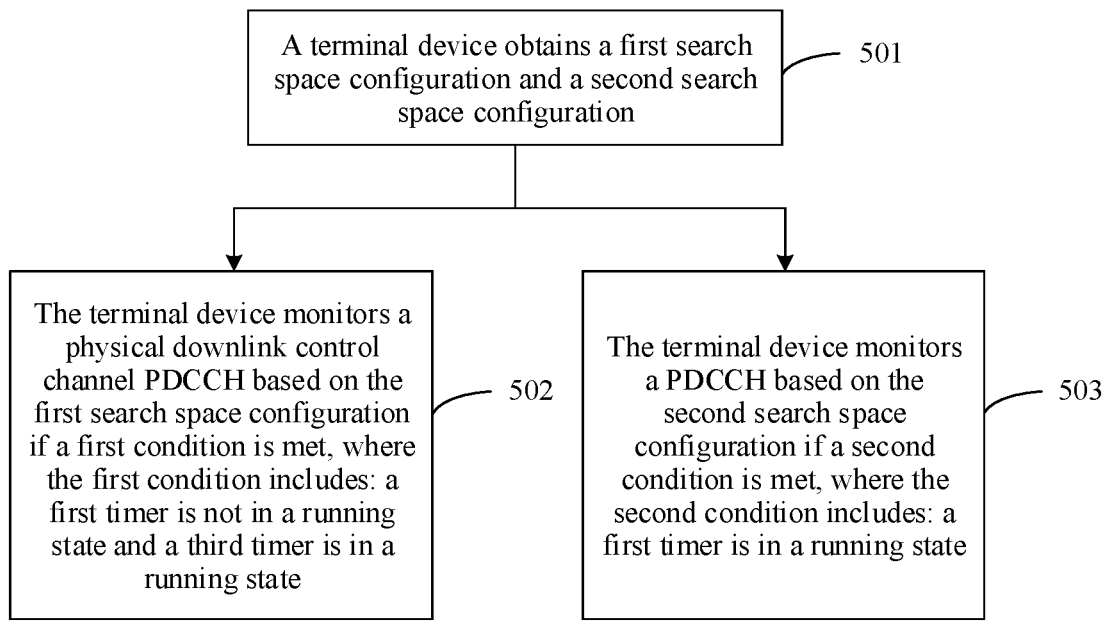
FIG. 5 is another schematic flowchart of a monitoring method according to an embodiment of the disclosure.

An embodiment of the disclosure further provides a monitoring method. As shown in FIG. 5, the method includes the following steps.

Step 501: A terminal device obtains a first search space configuration and a second search space configuration.

In this embodiment of the disclosure, the first search space configuration includes a first search space set, the second search space configuration includes a second search space set, and the first search space set is different from the second search space set. It should be noted that the search space set is a set including one or more pieces of search space, and the search space is used to determine a set of PDCCHs that need to be monitored by the terminal device.

For related descriptions and explanations of step 501, refer to the related descriptions of step 401 in the embodiments of the disclosure. Details are not described in this embodiment of the disclosure.

If a first condition is met, step 502 is performed. If a second condition is met, step 503 is performed.

Step 502: The terminal device monitors a physical downlink control channel PDCCH based on the first search space configuration if the first condition is met, where the first condition includes: a first timer is not in a running state and a third timer is in a running state.

In specific implementation, duration of the first timer may be configured by a network device through RRC signaling. In some embodiments, the duration of the timer is less than duration of an inactivity timer (drx-InactivityTimer). Certainly, in this embodiment of the disclosure, the first timer may alternatively be the drx-InactivityTimer, and is used to determine a time length of monitoring a PDCCH by the terminal device after the terminal device successfully decodes a PDCCH for scheduling new transmission.

In addition, the third timer is used to determine a time length of monitoring a PDCCH by the terminal device in one discontinuous reception DRX cycle. For example, the third timer is an on duration timer, an onDurationTimer, or a drx-onDurationTimer. In other words, if the first timer is not in a running state and the third timer is in a running state, the terminal device monitors the physical downlink control channel PDCCH based on the first search space configuration. The third timer may be started at a start moment of the DRX cycle. Alternatively, the third timer is started at a start moment of on duration (On Duration) in the DRX cycle, and a time length of the third timer is a length of the on duration.

Step 503: The terminal device monitors a PDCCH based on the second search space configuration if the second condition is met, where the second condition includes: the first timer is in a running state.

Figure 5A:
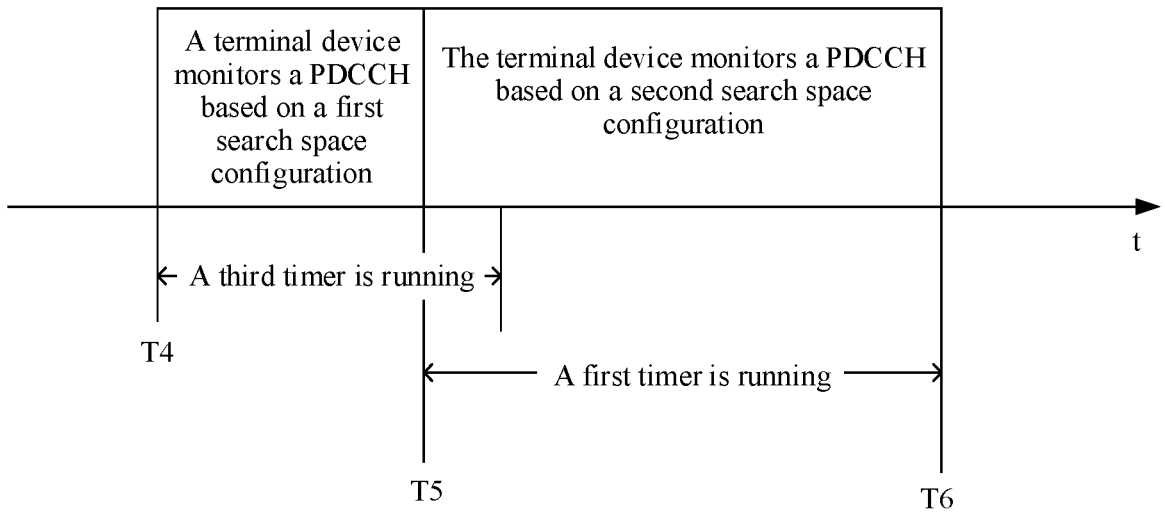
FIG. 5a is another schematic diagram of a monitoring method according to an embodiment of the disclosure.

For example, the first timer is a drx-InactivityTimer, and the third timer is an onDurationTimer. Referring to FIG. 5*a*, on duration in a DRX cycle starts from a moment T4, and the rx-InactivityTimer is started at a moment T5. In other words, from the moment T4 to the moment T5, the third timer is in a running state, and the first timer drx-InactivityTimer is not in a running state. The terminal device monitors the PDCCH based on the first search space configuration. The first timer drx-InactivityTimer is in a running state from the moment T5 to a moment T6, and the terminal device monitors the PDCCH based on the second search space configuration.

In the method provided in this embodiment of the disclosure, the network device configures the search space of the terminal device, so that power consumption of monitoring the PDCCH by the terminal device based on the first search space configuration is lower than power consumption of monitoring the PDCCH by the terminal based on the second search space configuration. This reduces power consumption of monitoring the PDCCH by the terminal device. For example, the first search space set is configured as a subset of the second search space set. Alternatively, it is configured that a first search space parameter indicates a relatively small quantity of PDCCH resources, a first search space parameter indicates a relatively small quantity of candidate PDCCHs, a first search space parameter indicates a relatively long PDCCH monitoring period, or the like.

This embodiment of the disclosure further provides other possible implementations of the first condition in step 502. In some embodiments, the first condition further includes one or more of the following cases: a downlink retransmission timer (such as a drx-Retransmission TimerDL or a drx-RetransmissionTimer) is not in a running state; an uplink retransmission timer (such as a drx-Retransmission TimerUL or a drx-ULRetransmissionTimer) is not in a running state; a contention resolution timer (such as an ra-ContentionResolutionTimer or a mac-ContentionResolutionTimer) is not in a running state; a scheduling request sent by the terminal device is not in a pending state; and the terminal device is not in a state in which "the terminal device receives, after successfully receiving a random access response RAR, no PDCCH used to indicate new transmission", where the PDCCH used to indicate new transmission is scrambled by using a cell radio network temporary identifier C-RNTI, the RAR is a response to a target random access preamble, and the target random access preamble is not a contention-based random access preamble.

For example, in some embodiments, if the first timer is not in a running state, the third timer is in a running state, and the downlink retransmission timer is not in a running state, the terminal device monitors the physical downlink control channel PDCCH based on the first search space configuration. In some other embodiments, if the first timer is not in a running state, the third timer is in a running state, the downlink retransmission timer is not in a running state, and the uplink retransmission timer is not in a running state, the terminal device monitors the physical downlink control channel PDCCH based on the first search space configuration.

The uplink retransmission timer is used to determine a time length of monitoring a PDCCH used to indicate uplink retransmission, and the downlink retransmission timer is used to determine a time length of monitoring a PDCCH used to indicate downlink retransmission. The contention resolution timer is used to determine a time length of monitoring, by the terminal device after the terminal device sends a message 3 in a random access process, a PDCCH used to indicate a message 4.

In some embodiments, the terminal device monitors the PDCCH based on the second search space configuration if one of the following cases occurs: the downlink retransmission timer is in a running state; the uplink retransmission timer is in a running state; the contention resolution timer is in a running state; the scheduling request sent by the terminal device is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

In addition, the PDCCH monitored by the terminal device may be a PDCCH scrambled by using a cell radio network temporary identifier (C-RNTI), a configured scheduling radio network temporary identifier (Configured Scheduling RNTI, CS-RNTI), an interruption radio network temporary identifier (Interruption RNTI, INT-RNTI), a slot format indication radio network temporary identifier (Slot Format Indication RNTI, SFI-RNTI), a semi-persistent channel state information radio network temporary identifier (Semi-Persistent CSI RNTI, SP-CSI-RNTI), a transmit power control radio network temporary identifier (Transmit Power Control RNTI, TPC-PUCCH-RNTI), a transmit power control physical uplink shared channel radio network temporary identifier (Transmit Power Control Physical Uplink Shared Channel RNTI, TPC-PUSCH-RNTI), or a transmit power control sounding reference signal radio network temporary identifier (Transmit Power Control Sounding Reference Signal RNTI, TPC-SRS-RNTI).

Figure 6:
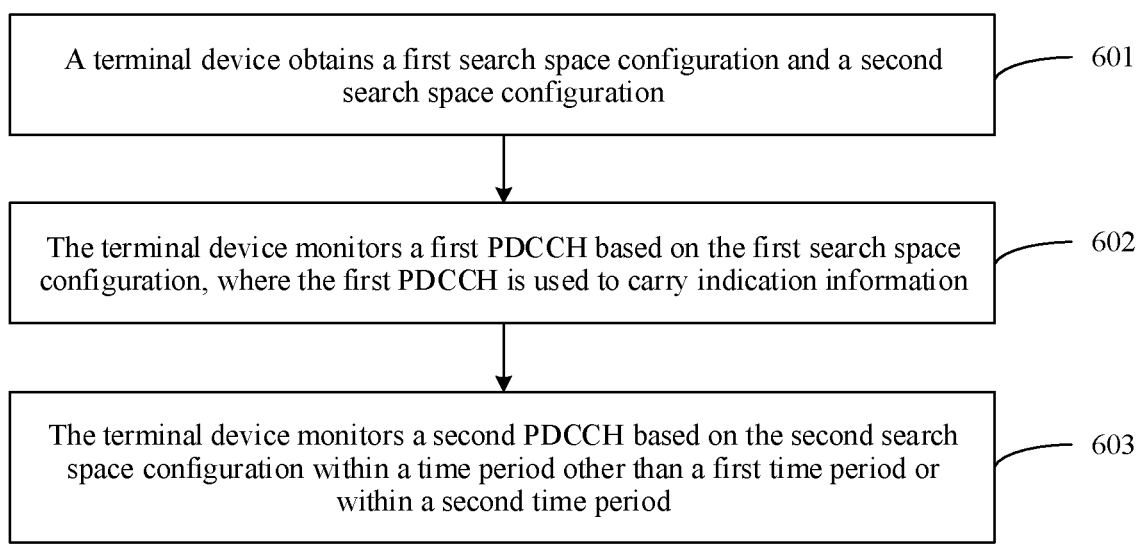
FIG. 6 is another schematic flowchart of a monitoring method according to an embodiment of the disclosure.

An embodiment of the disclosure further provides a monitoring method. As shown in FIG. 6, the method includes the following steps.

601: A terminal device obtains a first search space configuration and a second search space configuration.

The first search space configuration includes a first search space set, the second search space configuration includes a second search space set, and the first search space set is different from the second search space set. In some embodiments, the first search space set may be a subset of the second search space set. It should be noted that for detailed configurations of the first search space set and the second search space set, refer to a plurality of possible implementations provided in the related descriptions of step 401. Details are not described in this embodiment of the disclosure.

In some embodiments, the first search space configuration includes a first search space parameter, the second search space configuration includes a second search space parameter, and the first search space parameter is different from the second search space parameter. Specifically, the search space parameter includes at least one of the following parameters: a PDCCH monitoring period, PDCCH monitoring duration in each PDCCH monitoring period, a quantity of candidate PDCCHs, a CCE aggregation level, and an associated control resource set. It should be noted that for detailed configurations of the first search space parameter and the second search space parameter, refer to a plurality of possible implementations provided in the related descriptions of step 401. Details are not described in this embodiment of the disclosure.

It should be noted that, the terminal device may obtain the first search space configuration and the second search space configuration through signaling delivered by a network device, or may obtain the first search space configuration and the second search space configuration that are preconfigured. Specifically, the network device may notify the first search space configuration and the second search space configuration through two pieces of signaling. For example, the terminal device receives first information sent by the network device, where the first information includes or indicates the first search space configuration; and the terminal device receives second information sent by the network device, where the second information includes or indicates the second search space configuration. In other words, the network device encapsulates the first information and the second information into two pieces of signaling, and separately delivers the two pieces of signaling to the terminal device. Certainly, the network device may alternatively encapsulate the first information and the second information into one piece of signaling, and deliver the piece of signaling to the terminal device. Alternatively, the network device may notify the terminal device of only one of the first search space configuration and the second search space configuration, and the terminal device may derive the second search space configuration based on the first search space configuration, or derive the first search space configuration based on the second search space configuration.

602: The terminal device monitors a first PDCCH based on the first search space configuration, where the first PDCCH is used to carry indication information.

The indication information is used to indicate the terminal device not to monitor a second PDCCH within a first time period existing after the terminal device receives the indication information, or the indication information is used to indicate the terminal device to monitor the second PDCCH within a second time period existing after the terminal device receives the indication information. The second PDCCH does not carry the indication information.

In a possible implementation, the indication information is used to indicate the terminal device not to expect the second PDCCH within the first time period existing after the terminal device receives the indication information, or the indication information is used to indicate that the network device does not send the second PDCCH to the terminal device within the first time period existing after the network device sends the indication information.

It should be noted that a time period (e.g., the first time period or the second time period) in this embodiment of the disclosure may be one or more pieces of on duration existing after the indication information is received, or may be a time period with a length of M time units that exists after N time units after the indication information is received, or may be L PDCCH monitoring occasions existing after the indication information is received. The time unit may be an absolute time such as millisecond, or may be a symbol, a slot, a subframe, or the like. N is greater than or equal to 0, M is greater than or equal to 1, and L is greater than or equal to 1.

In some embodiments, the second PDCCH may be a PDCCH used to indicate data transmission.

In some embodiments, the second PDCCH may be a PDCCH scrambled by using a cell radio network temporary identifier (C-RNTI), a configured scheduling radio network temporary identifier (Configured Scheduling RNTI, CS-RNTI), an interruption radio network temporary identifier (Interruption RNTI, INT-RNTI), a slot format indication radio network temporary identifier (Slot Format Indication RNTI, SFI-RNTI), a semi-persistent channel state information radio network temporary identifier (Semi-Persistent CSI RNTI, SP-CSI-RNTI), a transmit power control radio network temporary identifier (Transmit Power Control RNTI, TPC-PUCCH-RNTI), a transmit power control physical uplink shared channel radio network temporary identifier (Transmit Power Control Physical Uplink Shared Channel RNTI, TPC-PUSCH-RNTI), or a transmit power control sounding reference signal radio network temporary identifier (Transmit Power Control Sounding Reference Signal RNTI, TPC-SRS-RNTI).

In some embodiments, the indication information further includes or indicates the second search space configuration. The terminal device monitors the first PDCCH based on the first search space configuration, may obtain the second search space configuration in the indication information after receiving the first PDCCH and obtaining the indication information carried in the PDCCH, and further monitors, based on the second search space configuration in the indication information, another PDCCH, namely, the second PDCCH in this embodiment of the disclosure, that does not carry the indication information. In a possible implementation, the second search space configuration includes the second search space set, and the indication information includes an index of each piece of search space in the second search space set. In another possible implementation, the second search space configuration includes the second search space set, and the indication information includes a field used to indicate the second search space set. In another possible implementation, the second search space configuration includes the second search space parameter, the second search space parameter includes a second PDCCH monitoring period, and the indication information includes the second PDCCH monitoring period. Certainly, the indication information may not directly include the second search space configuration, but may be used to indicate the second search space configuration by using some parameters. In a possible implementation, the second search space configuration includes the second search space parameter, the second search space parameter includes a second PDCCH monitoring period, the indication information includes a scale factor, and the terminal device determines the second PDCCH monitoring period based on the scale factor.

603: The terminal device monitors the second PDCCH based on the second search space configuration within a time period other than the first time period or within the second time period.

Specifically, if the indication information is used to indicate the terminal device not to monitor the second PDCCH within the first time period existing after the terminal device receives the indication information, the terminal device monitors the second PDCCH based on the second search space configuration within the time period other than the first time period.

Alternatively, if the indication information is used to indicate the terminal device to monitor the second PDCCH within the second time period existing after the terminal device receives the indication information, the terminal device monitors the second PDCCH based on the second search space configuration within the second time period.

In some embodiments, the indication information further includes a MIMO layer quantity to be used for a PDSCH indicated by the second PDCCH. Alternatively, the indication information is further used to indicate a MIMO layer quantity to be used for a PDSCH indicated by the second PDCCH. The terminal device may use the corresponding MIMO layer quantity according to the indication information to receive the PDSCH. It should be noted that the MIMO layer quantity included in or indicated by the indication information may be a maximum MIMO layer quantity.

In the method provided in this embodiment of the disclosure, power consumption caused by PDCCH monitoring to the terminal device can be reduced by using the indication information. In addition, the terminal device uses different search space to monitor the PDCCH that carries the indication information and the PDCCH that does not carry the indication information, and the terminal device no longer uses all pieces of search space to monitor the PDCCH, so that power consumption of the terminal device can also be reduced.

Figure 7:
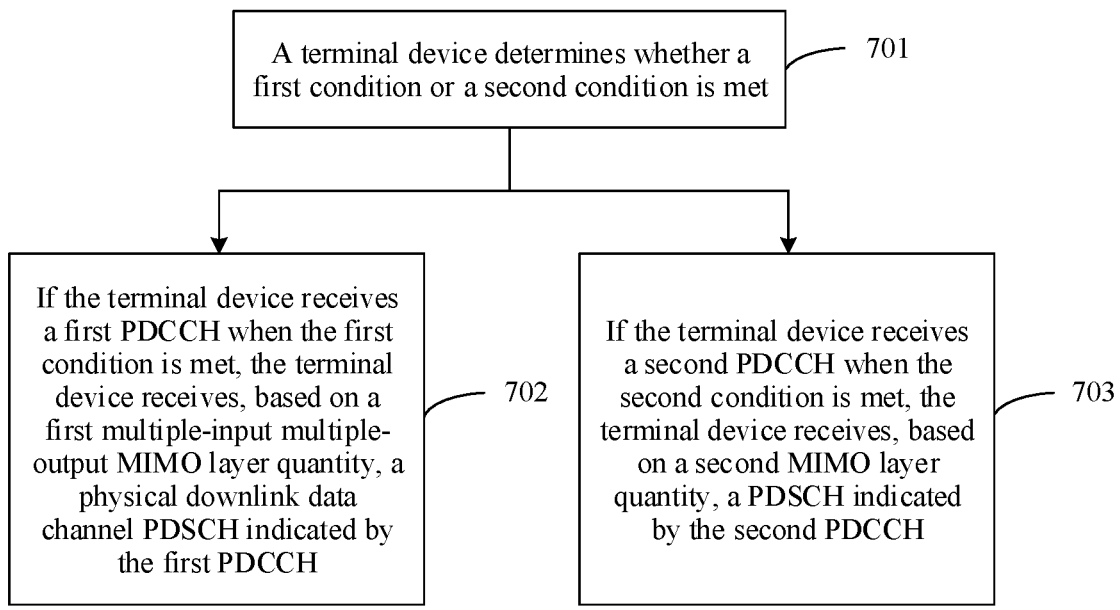
FIG. 7 is a schematic flowchart of a communication method according to an embodiment of the disclosure.

An embodiment of the disclosure provides a communication method. A terminal device can use a proper MIMO layer quantity to receive a PDSCH sent by a network device, to reduce power consumption of receiving the PDSCH by the terminal device. As shown in FIG. 7, the method specifically includes the following steps.

701: The terminal device determines whether a first condition or a second condition is met. The first condition includes that a first timer is not in a running state, and the second condition includes that the first timer is in a running state.

In specific implementation, duration of the first timer may be configured by the network device through RRC signaling. In some embodiments, the duration of the timer is less than duration of an inactivity timer (drx-InactivityTimer). Certainly, in this embodiment of the disclosure, the first timer may alternatively be the drx-InactivityTimer, and is used to determine a time length of monitoring a PDCCH by the terminal device after the terminal device successfully decodes a PDCCH for scheduling new transmission.

In specific implementation, the first timer is started or restarted if the terminal device receives a PDCCH; the first timer is started or restarted if the terminal device receives a PDCCH used to indicate data transmission; the first timer is started or restarted if the terminal device receives a PDCCH used to indicate new transmission; or the terminal device starts or restarts the first timer if a second timer is started or restarted, where the second timer is used to determine a time length of monitoring a PDCCH by the terminal device after the terminal device receives a PDCCH used to indicate new transmission. For example, the second timer is a drx-InactivityTimer. Alternatively, if the terminal device receives indication information sent by the network device, the terminal device starts or restarts the first timer. The indication information may be transmitted through downlink control information (DCI), or may be transmitted through a medium access control control element (MAC CE). The PDCCH used to indicate data transmission may be a PDCCH used to indicate uplink transmission, or may be a PDCCH used to indicate downlink transmission.

If the first condition is met, step 702 is performed. If the second condition is met, step 703 is performed.

702: If the terminal device receives a first PDCCH when the first condition is met, the terminal device receives, based on a first multiple-input multiple-output MIMO layer quantity, a physical downlink shared channel PDSCH indicated by the first PDCCH.

703: If the terminal device receives a second PDCCH when the second condition is met, the terminal device receives, based on a second MIMO layer quantity, a PDSCH indicated by the second PDCCH.

In specific implementation, the first MIMO layer quantity is different from the second MIMO layer quantity. In some embodiments, the first MIMO layer quantity is a MIMO layer quantity to be used for the PDSCH indicated by the first PDCCH, and the second MIMO layer quantity is a MIMO layer quantity to be used for the PDSCH indicated by the second PDCCH. In some other embodiments, the first MIMO layer quantity is a maximum MIMO layer quantity that may be used for the PDSCH indicated by the first PDCCH, and the second MIMO layer quantity is a maximum MIMO layer quantity that may be used for the PDSCH indicated by the second PDCCH. In some embodiments, the first MIMO layer quantity is less than the second MIMO layer quantity. For example, the first MIMO layer quantity is 2, and the second MIMO layer quantity is 4. If the first condition is met, the terminal device may enable only two receive antennas or two receive chains. If the second condition is met, the terminal device needs to enable four receive antennas or four receive chains. In this way, power consumption of the terminal device is reduced as much as possible.

Usually, the network device indicates, in downlink control information (DCI), an antenna port antenna port used for the PDSCH. A quantity of antenna ports is a value of the MIMO layer quantity. When the MIMO layer quantity is relatively small, the terminal device may use a relatively small quantity of receive antennas or receive chains (Rx chain). When the MIMO layer quantity is relatively large, the terminal device needs to use a relatively large quantity of receive antennas or receive chains. Therefore, power consumption caused when the terminal device uses a larger MIMO layer quantity is higher than power consumption caused when the terminal device uses a smaller MIMO layer quantity. To reduce power consumption of the terminal device, the terminal device may receive the PDSCH by using different MIMO layer quantities in different cases.

It should be noted that the second MIMO layer quantity may be a maximum MIMO layer quantity that can be supported by the terminal device and that is indicated by capability information of the terminal device, for example, maxNumberMIMO-LayersPDSCH in FeatureSetDownlinkPerCC IE.

The first MIMO layer quantity may be configured by the network device. Before the network device configures the first MIMO layer quantity, the terminal device may send indication information to the network device, to indicate a first MIMO layer quantity expected or recommended by the terminal device. The first MIMO layer quantity may alternatively be determined based on the second MIMO layer quantity. For example, the first MIMO layer quantity is obtained by rounding up a value obtained after the second MIMO layer quantity is divided by 2.

In addition, this embodiment of the disclosure further provides other possible implementations of the first condition in step 701 and step 702. The first condition may specifically include the following four possible cases.

(1) In addition to including that the first timer is not in a running state, the first condition further includes that a third timer is in a running state.

It should be noted that the third timer is used to determine a time length of monitoring a PDCCH by the terminal device in one discontinuous reception DRX cycle. For example, the third timer is an on duration timer, an onDurationTimer, or a drx-onDurationTimer. In other words, if the first timer is not in a running state and the third timer is in a running state, a PDCCH received by the terminal device is denoted as the first PDCCH. Further, the terminal device may receive, based on the first MIMO layer quantity, the PDSCH indicated by the first PDCCH. The third timer may be started at a start moment of the DRX cycle. Alternatively, the third timer is started at a start moment of on duration (On Duration) in the DRX cycle, and a time length of the third timer is a length of the on duration.

(2) In some embodiments, the first condition may further include that the terminal device is within on duration in a DRX cycle. In other words, if the first timer is not in a running state and the terminal device is within the on duration in the DRX cycle, a PDCCH received by the terminal device is denoted as the first PDCCH. Further, the terminal device may receive, based on the first MIMO layer quantity, the PDSCH indicated by the first PDCCH.

(3) In some embodiments, the first condition further includes one or more of the following cases: a downlink retransmission timer (such as a drx-Retransmission TimerDL or a drx-RetransmissionTimer) is not in a running state; an uplink retransmission timer (such as a drx-Retransmission TimerUL or a drx-ULRetransmissionTimer) is not in a running state; a contention resolution timer (such as an ra-ContentionResolutionTimer or a mac-ContentionResolutionTimer) is not in a running state; a scheduling request sent by the terminal device is not in a pending state; and the terminal device is not in a state in which "the terminal device receives, after successfully receiving a random access response RAR, no PDCCH used to indicate new transmission", where the PDCCH used to indicate new transmission is scrambled by using a cell radio network temporary identifier C-RNTI, the RAR is a response to a target random access preamble, and the target random access preamble is not a contention-based random access preamble.

For example, in some embodiments, if the first timer is not in a running state and the downlink retransmission timer is not in a running state, a PDCCH received by the terminal device is denoted as the first PDCCH. Further, the terminal device may receive, based on the first MIMO layer quantity, the PDSCH indicated by the first PDCCH. In some other embodiments, if the first timer is not in a running state, the downlink retransmission timer is not in a running state, and the uplink retransmission timer is not in a running state, a PDCCH received by the terminal device is denoted as the first PDCCH, and the terminal device may further receive, based on the first MIMO layer quantity, the PDSCH indicated by the first PDCCH. In some other embodiments, if the first timer is not in a running state, the third timer is in a running state, and the downlink retransmission timer is not in a running state, a PDCCH received by the terminal device is denoted as the first PDCCH, and the terminal device may further receive, based on the first MIMO layer quantity, the PDSCH indicated by the first PDCCH.

The uplink retransmission timer is used to determine a time length of monitoring a PDCCH used to indicate uplink retransmission, and the downlink retransmission timer is used to determine a time length of monitoring a PDCCH used to indicate downlink retransmission. The contention resolution timer is used to determine a time length of monitoring, by the terminal device after the terminal device sends a message 3 in a random access process, a PDCCH used to indicate a message 4.

(4) In some embodiments, the first condition is that the terminal device is between a first moment and a second moment. The second moment is a third moment, and the third moment is a moment at which the terminal device receives the $N^{th}$ PDCCH after the first moment. Alternatively, the second moment is a moment later than the third moment by first duration. N is an integer greater than or equal to 1, and a length of the first duration is greater than 0. If the first condition is met, a PDCCH received by the terminal device is denoted as the first PDCCH, and the terminal device may further receive, based on the first MIMO layer quantity, the PDSCH indicated by the first PDCCH. The second condition is that the terminal device is after the second moment. If the second condition is met, a PDCCH received by the terminal device is denoted as the second PDCCH, and the terminal device may further receive, based on the second MIMO layer quantity, the PDSCH indicated by the second PDCCH. In some embodiments, the first moment may be a start moment of DRX on duration. In some embodiments, if an inactivity timer expires within on duration in a DRX cycle, the first moment is a moment at which the inactivity timer expires. In the fourth possible case, the second condition is that the terminal device is after the second moment.

In some embodiments, the terminal device receives the PDSCH based on the second MIMO layer quantity if one of the following cases occurs: the downlink retransmission timer is in a running state; the uplink retransmission timer is in a running state; the contention resolution timer is in a running state; the terminal device sends the scheduling request and the scheduling request is in a pending state; and the terminal device receives, after successfully receiving the random access response RAR, no PDCCH used to indicate new transmission, where the PDCCH used to indicate new transmission is scrambled by using the cell radio network temporary identifier C-RNTI, the RAR is the response to the target random access preamble, and the target random access preamble is not the contention-based random access preamble.

Figure 8:
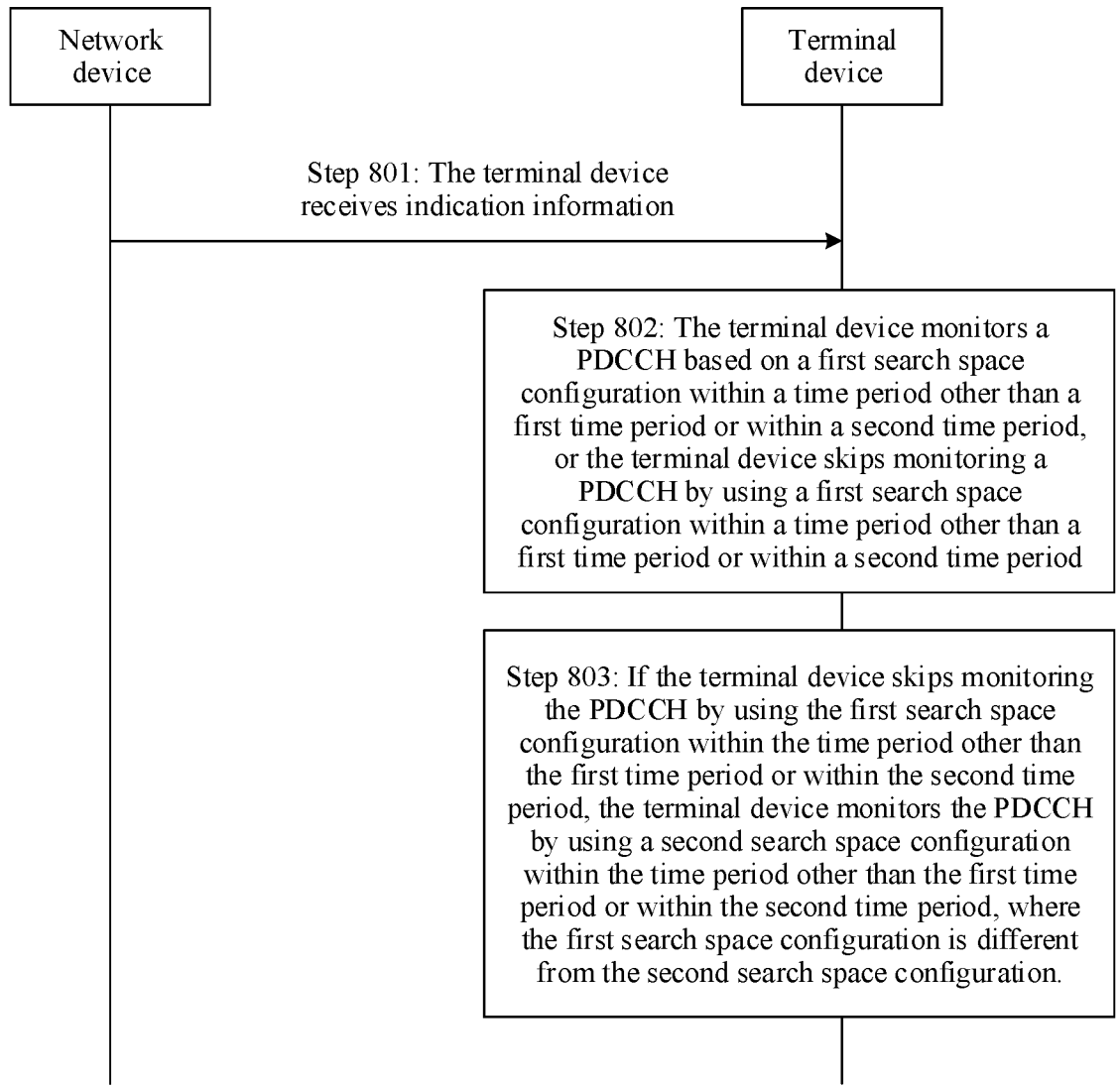
FIG. 8 is another schematic flowchart of a communication method according to an embodiment of the disclosure.

An embodiment of the disclosure further provides a communication method. As shown in FIG. 8, the method includes the following steps.

Step 801: A terminal device receives indication information, where the indication information is used to indicate the terminal device not to monitor a PDCCH within a first time period existing after the terminal device receives the indication information, or the indication information is used to indicate the terminal device to monitor the PDCCH within a second time period existing after the terminal device receives the indication information. The indication information includes or indicates a first search space configuration.

Step 802: The terminal device monitors the PDCCH based on the first search space configuration within a time period other than the first time period or within the second time period, or the terminal device skips monitoring the PDCCH by using the first search space configuration within a time period other than the first time period or within the second time period.

It should be noted that when the first search space configuration is not used to monitor the PDCCH, the method may further include step 803: If the terminal device skips monitoring the PDCCH by using the first search space configuration within the time period other than the first time period or within the second time period, the terminal device monitors the PDCCH by using a second search space configuration within the time period other than the first time period or within the second time period. The first search space configuration is different from the second search space configuration.

The first search space configuration includes a first search space set, the second search space configuration includes a second search space set, and the first search space set is different from the second search space set. In some embodiments, the first search space set may be a subset of the second search space set. It should be noted that for detailed configurations of the first search space set and the second search space set, refer to a plurality of possible implementations provided in the related descriptions of step 401. Details are not described in this embodiment of the disclosure.

In some embodiments, the first search space configuration includes a first search space parameter, the second search space configuration includes a second search space parameter, and the first search space parameter is different from the second search space parameter. Specifically, the search space parameter includes at least one of the following parameters: a PDCCH monitoring period, PDCCH monitoring duration in each PDCCH monitoring period, a quantity of candidate PDCCHs, a CCE aggregation level, and an associated control resource set. It should be noted that for detailed configurations of the first search space parameter and the second search space parameter, refer to a plurality of possible implementations provided in the related descriptions of step 401. Details are not described in this embodiment of the disclosure.

In some embodiments, the PDCCH may be a PDCCH used to indicate data transmission.

In some embodiments, the PDCCH may be a PDCCH scrambled by using a cell radio network temporary identifier (C-RNTI), a configured scheduling radio network temporary identifier (Configured Scheduling RNTI, CS-RNTI), an interruption radio network temporary identifier (Interruption RNTI, INT-RNTI), a slot format indication radio network temporary identifier (Slot Format Indication RNTI, SFI-RNTI), a semi-persistent channel state information radio network temporary identifier (Semi-Persistent CSI RNTI, SP-CSI-RNTI), a transmit power control radio network temporary identifier (Transmit Power Control RNTI, TPC-PUCCH-RNTI), a transmit power control physical uplink shared channel radio network temporary identifier (Transmit Power Control Physical Uplink Shared Channel RNTI, TPC-PUSCH-RNTI), or a transmit power control sounding reference signal radio network temporary identifier (Transmit Power Control Sounding Reference Signal RNTI, TPC-SRS-RNTI).

Figure 9:
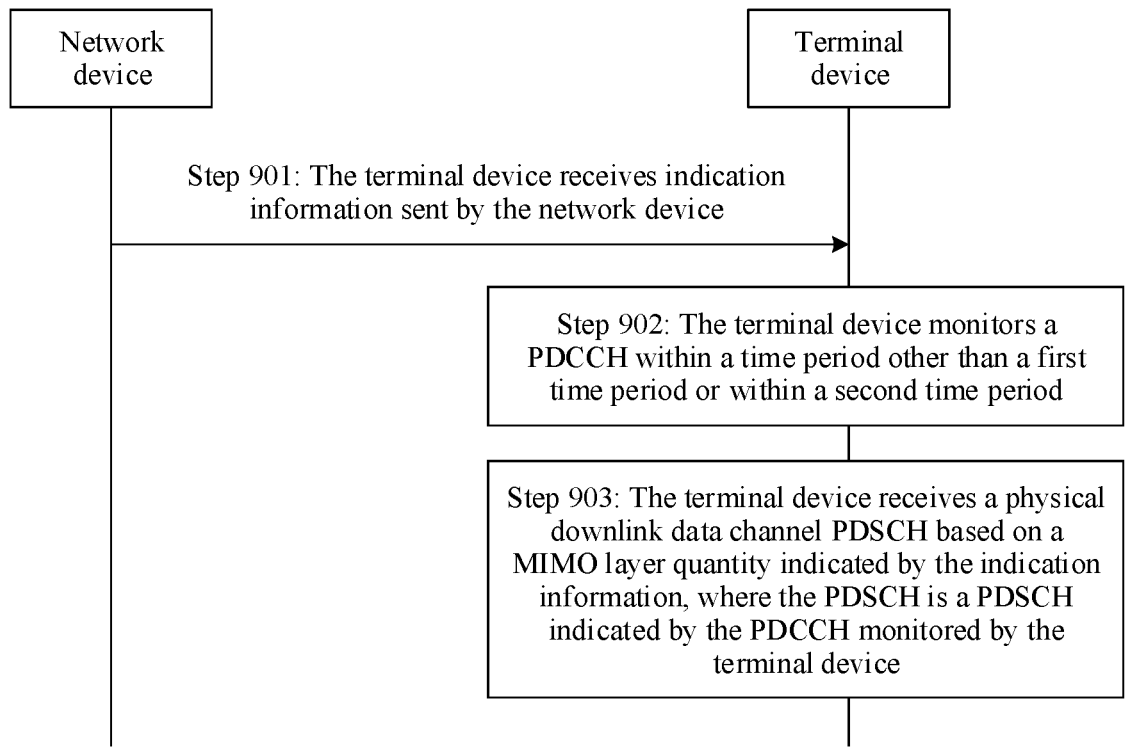
FIG. 9 is another schematic flowchart of a communication method according to an embodiment of the disclosure.

An embodiment of the disclosure further provides a communication method. As shown in FIG. 9, the method includes the following steps.

901: A terminal device receives indication information sent by a network device, where the indication information is used to indicate the terminal device not to monitor a PDCCH within a first time period existing after the terminal device receives the indication information, or the indication information is used to indicate the terminal device to monitor a PDCCH within a second time period existing after the terminal device receives the indication information.

In a possible implementation, the indication information is used to indicate the terminal device not to expect a second PDCCH within the first time period existing after the terminal device receives the indication information, or the indication information is used to indicate that the network device does not send a second PDCCH to the terminal device within the first time period existing after the network device sends the indication information.

It should be noted that a time period (e.g., the first time period or the second time period) in this embodiment of the disclosure may be one or more pieces of on duration existing after the indication information is received, or may be a time period with a length of M time units that exists after N time units after the indication information is received. The time unit may be an absolute time such as millisecond, or may be a symbol, a slot, a subframe, or the like. N is greater than or equal to 0, and M is greater than or equal to 1.

902: The terminal device monitors the PDCCH within a time period other than the first time period or within the second time period.

Specifically, if the indication information is used to indicate the terminal device not to monitor the second PDCCH within the first time period existing after the terminal device receives the indication information, the terminal device monitors the second PDCCH within the time period other than the first time period.

Alternatively, if the indication information is used to indicate the terminal device to monitor the second PDCCH within the second time period existing after the terminal device receives the indication information, the terminal device monitors the second PDCCH within the second time period.

903: The terminal device receives a physical downlink shared channel PDSCH based on a MIMO layer quantity indicated by the indication information, where the PDSCH is a PDSCH indicated by the PDCCH monitored by the terminal device.

Specifically, the indication information may further include or indicate the MIMO layer quantity. Further, the terminal device may receive the PDSCH based on the corresponding MIMO layer quantity, to reduce power consumption. In some embodiments, the MIMO layer quantity is a MIMO layer quantity to be used for the PDSCH indicated by the PDCCH. In some other embodiments, the MIMO layer quantity is a maximum MIMO layer quantity that may be used for the PDSCH indicated by the PDCCH.

In the method provided in this embodiment of the disclosure, the network device can reduce, by using the indication information, power consumption caused by PDCCH monitoring to the terminal device.

Figure 10:
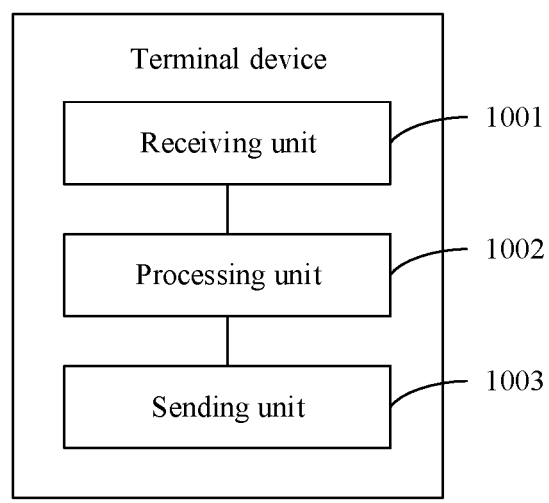
FIG. 10 is another structural block diagram of a terminal device according to an embodiment of the disclosure.

An embodiment of the disclosure provides a terminal device. The terminal device may be the terminal device in the embodiments of the disclosure, for example, the terminal device in the communications system shown in FIG. 1. When each function module is obtained through division based on each corresponding function, FIG. 10 is a possible schematic structural diagram of the foregoing terminal device. As shown in FIG. 10, the terminal device includes a receiving unit 1001, a processing unit 1002, and a sending unit 1003.

The receiving unit 1001 is configured to support the terminal device in performing step 402, step 403, step 502, step 503, step 602, step 603, step 702, step 703, step 801, step 802, step 803, step 901, step 902, and step 903 in the foregoing embodiments, and/or another process in the technology described in this specification.

The processing unit 1002 is configured to support the terminal device in performing step 401, step 501, step 601, and step 701 in the embodiments of the disclosure, and/or another process in the technology described in this specification.

The sending unit 1003 is configured to support the terminal device in sending a signal to another device, for example, sending an uplink signal to a network device, and/or performing another process in the technology described in this specification.

It should be noted that all related content of the steps in the foregoing method embodiments may be cited in function descriptions of corresponding function modules. Details are not described herein again.

Figure 11:
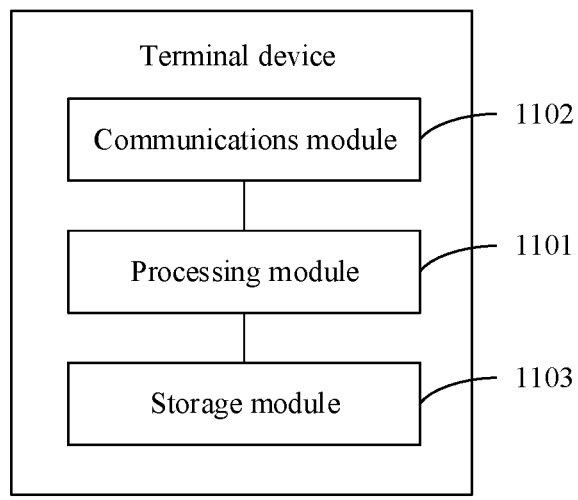
FIG. 11 is another structural block diagram of a terminal device according to an embodiment of the disclosure.

For example, when an integrated unit is used, FIG. 11 is a schematic structural diagram of a terminal device according to an embodiment of this application. In FIG. 11, the terminal device includes a processing module 1101 and a communications module 1102. The processing module 1101 is configured to control and manage actions of the terminal device, for example, perform the step performed by the foregoing processing unit 1002, and/or another process in the technology described in this specification. The communications module 1102 is configured to support interaction between the terminal device and another device, for example, perform the steps performed by the foregoing receiving unit 1001 and sending unit 1003. As shown in FIG. 11, the terminal device may further include a storage module 1103, and the storage module 1103 is configured to store program code and data of the terminal device.

When the processing module 1101 is a processor, the communications module 1102 is a transceiver, and the storage module 1103 is a memory, the terminal device may be the terminal device shown in FIG. 3.

Figure 12:
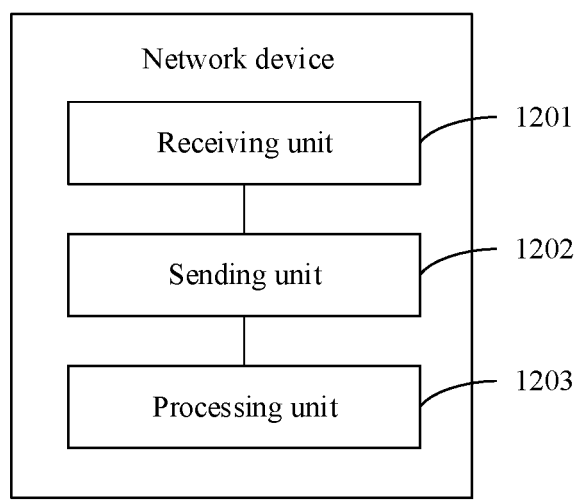
FIG. 12 is a structural block diagram of a network device according to an embodiment of the disclosure.

When each function module is obtained through division based on each corresponding function, FIG. 12 is a possible schematic structural diagram of the network device in the foregoing embodiments. As shown in FIG. 12, the network device includes a receiving unit 1201, a sending unit 1202, and a processing unit 1203.

The receiving unit 1201 is configured to support the network device in receiving a signal sent by another device, for example, receiving an uplink signal sent by a terminal device, and/or performing another process in the technology described in this specification.

The sending unit 1202 is configured to support the network device in sending a downlink signal to the terminal device, for example, performing sending procedures in step 801 and step 901 in the foregoing embodiments, and/or another process in the technology described in this specification.

The processing unit 1203 is configured to support the network device in performing the foregoing embodiments, and/or another process in the technology described in this specification.

It should be noted that all related content of the steps in the foregoing method embodiments may be cited in function descriptions of corresponding function modules. Details are not described herein again.

Figure 13:
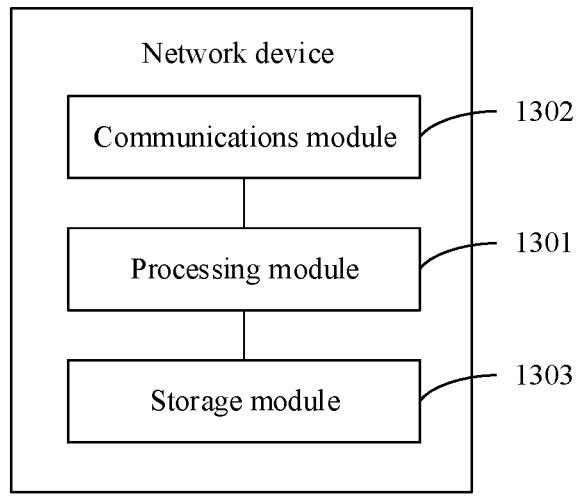
FIG. 13 is another structural block diagram of a network device according to an embodiment of the disclosure.

For example, when an integrated unit is used, FIG. 13 is a schematic structural diagram of a network device according to an embodiment of this application. In FIG. 13, the network device includes a processing module 1301 and a communications module 1302. The processing module 1201 is configured to control and manage actions of the network device, for example, perform the step performed by the foregoing processing unit 1203, and/or another process in the technology described in this specification. The communications module 1302 is configured to support interaction between the network device and another device, for example, perform the steps performed by the foregoing receiving unit 1201 and sending unit 1202, and various types of interaction with the network device. As shown in FIG. 13, the network device may further include a storage module 1303, and the storage module 1303 is configured to store program code and data of the network device.

Figure 14:
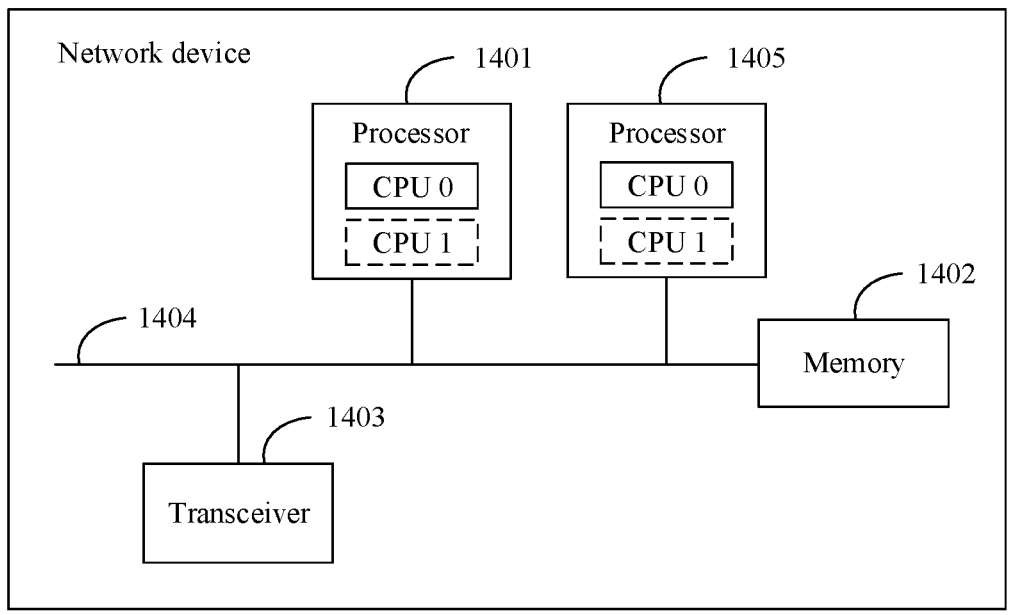
FIG. 14 is another structural block diagram of a network device according to an embodiment of the disclosure.

When the processing module 1301 is a processor, the communications module 1302 is a transceiver, and the storage module 1303 is a memory, the network device is a network device shown in FIG. 14. Referring to FIG. 14, the network device may include at least one processor 1401, a memory 1402, a transceiver 1403, and a communications bus 1404. The processor 1401, the memory 1402, and the transceiver 1403 are connected to each other by using the communications bus 1404.

The following describes components of the network device in detail with reference to FIG. 14.

The processor 1401 is a control center of the network device. The processor 1401 may perform various functions of the network device by running or executing a software program stored in the memory 1402 and invoking data stored in the memory 1402.

In specific implementation, in an embodiment, the processor 1401 may include one or more CPUs, for example, a CPU 0 and a CPU 1 that are shown in FIG. 14.

The network device may include a plurality of processors, for example, the processor 1401 and a processor 1405 shown in FIG. 14. Each of the processors may be a single-core (single-CPU) processor or may be a multi-core (multi-CPU) processor. The processor herein may refer to one or more network devices, circuits, and/or processing cores configured to process data (e.g., a computer program instruction).

The transceiver 1403 is any network device of a transceiver type, and is used for communication with another device, for example, communication with a network device. Certainly, the transceiver 1403 may be further configured to communicate with a communications network.

A network device structure shown in FIG. 14 does not constitute a limitation on the network device. The network device may include more or fewer components than those shown in the figure, or combine some components, or have a different component arrangement.

An embodiment of the disclosure further provides a computer-readable storage medium. The computer-readable storage medium stores an instruction. When the computer-readable storage medium is run on the terminal device shown in FIG. 11, FIG. 10, and FIG. 3, the terminal device is enabled to perform the methods shown in FIG. 4 to FIG. 9.

An embodiment of the disclosure further provides a computer-readable storage medium. The computer-readable storage medium stores an instruction. When the computer-readable storage medium is run on the network device shown in FIG. 12, FIG. 13, and FIG. 14, the network device is enabled to perform the methods shown in FIG. 4 to FIG. 9.

An embodiment of the disclosure further provides a wireless communications apparatus. The wireless communications apparatus stores an instruction. When the wireless communications apparatus is run on the terminal device shown in FIG. 11, FIG. 10, and FIG. 3, the wireless communications apparatus is enabled to perform the methods shown in FIG. 4 to FIG. 9. The wireless communications apparatus may be a chip.

An embodiment of the disclosure further provides a wireless communications apparatus. The wireless communications apparatus stores an instruction. When the wireless communications apparatus is run on the network device shown in FIG. 12, FIG. 13, and FIG. 14, the wireless communications apparatus is enabled to perform the methods shown in FIG. 4 to FIG. 9. The wireless communications apparatus may be a chip.

The foregoing descriptions about implementations allow a person skilled in the art to clearly understand that, for the purpose of convenient and brief description, division into the foregoing function modules is merely taken as an example for illustration. In actual application, the foregoing functions may be allocated to different function modules for implementation based on a requirement. To be specific, an inner structure of a database access apparatus is divided into different function modules to implement all or some of the functions described above.

In the several embodiments provided in this application, it should be understood that the disclosed database access apparatus and method may be implemented in other manners. For example, the described database access apparatus embodiments are merely examples. For example, the division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed on a plurality of different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   obtaining a first search space configuration comprising a first search space set and the second search space configuration comprising a second search space set wherein the first search space set is different from the second search space set; and
   monitoring a physical downlink control channel (PDCCH) based on the first search space set;
   in response to receiving a first PDCCH when monitoring the PDCCH based on the first search space set, starting a first timer and monitoring the PDCCH based on the second search space set; and
   in response to receiving a second PDCCH when monitoring the PDCCH based on the second search space set, restarting the first timer.

2. The method according to claim 1, wherein the method further comprises:
   monitoring the PDCCH based on the first search space set after the first timer expires.

3. The method according to claim 1, wherein the obtaining comprises:
   receiving first information that comprises or indicates the first search space configuration; and
   receiving second information that comprises or indicates the second search space configuration.

4. The method according to claim 1, wherein the method further comprises:
   receiving a search space information element that comprises indication information indicating a search space belongs to:
   the first search space set,
   the second search space set, or
   the first search space set and the second search space set.

5. The method according to claim 4, wherein the search space is a user equipment (UE) specific PDCCH parameter.

6. The method according to claim 1, wherein a length of the first timer is configured by radio resource control (RRC) signaling.

7. The method according to claim 1, wherein:
   the first search space set comprises one or more search spaces, and each of the one or more search spaces comprises at least one parameter taken from the group consisting of:
   a PDCCH monitoring period,
   a PDCCH monitoring duration in each PDCCH monitoring period,
   a quantity of candidate PDCCHs, a CCE aggregation level, and
   an associated control resource set; and
   the second search space set comprises one or more search spaces, and each of the one or more search spaces comprises at least one parameter taken from the group consisting of:
   a PDCCH monitoring period,
   a PDCCH monitoring duration in each PDCCH monitoring period,
   a quantity of candidate PDCCHs,
   a CCE aggregation level, and
   an associated control resource set.

8. The method according to claim 1, wherein the first search space and the second search space are in the same bandwidth part (BWP).

9. An apparatus, comprising:
   at least one processor; and
   at least one memory comprising instructions that, when executed by the at least one processor, cause the apparatus to carry out a method comprising:
   obtaining a first search space configuration and a second search space configuration, wherein:
   the first search space configuration comprises a first search space set,
   the second search space configuration comprises a second search space set, and
   the first search space set is different from the second search space set; and monitoring a physical downlink control channel (PDCCH) based on the first search space set;
   in response to receiving a first PDCCH when monitoring the PDCCH based on the first search space set, starting a first timer and monitoring the PDCCH based on the second search space set; and
   in response to receiving a second PDCCH when monitoring the PDCCH based on the second search space set, restarting the first timer.

10. The apparatus according to claim 9, wherein the method further comprises:
    monitoring the PDCCH based on the first search space set after the first timer expires.

11. The apparatus according to claim 9, wherein the obtain a first search space configuration and a second search space configuration comprises:
    receive first information, wherein the first information comprises or indicates the first search space configuration; and
    receive second information, wherein the second information comprises or indicates the second search space configuration.

12. The apparatus according to claim 9, wherein the method further comprises:
    receiving a search space information element that comprises indication information indicating a search space belongs to:
    the first search space set,
    the second search space set, or
    the first search space set and the second search space set.

13. The apparatus according to claim 12, wherein the search space is a user equipment (UE) specific PDCCH parameter.

14. The apparatus according to claim 9, wherein a length of the first timer is configured by radio resource control (RRC) signaling.

15. The apparatus according to claim 9, wherein:
- the first search space set comprises one or more search spaces, and each of the one or more search spaces comprises at least one parameter taken from the group consisting of:
  - a PDCCH monitoring period,
  - a PDCCH monitoring duration in each PDCCH monitoring period,
  - a quantity of candidate PDCCHs,
  - a CCE aggregation level, and
  - an associated control resource set; and
- the second search space set comprises one or more search spaces, and each of the one or more search spaces comprises at least one parameter taken from the group consisting of:
  - a PDCCH monitoring period,
  - a PDCCH monitoring duration in each PDCCH monitoring period,
  - a quantity of candidate PDCCHs,
  - a CCE aggregation level, and
  - an associated control resource set.

16. The apparatus according to claim 9, wherein the first search space and the second search space are in the same bandwidth part (BWP).

\* \* \* \* \*

UNITED STATES PATENT AND TRADEMARK OFFICE
CERTIFICATE OF CORRECTION

PATENT NO. : 12,052,591 B2
APPLICATION NO. : 17/266040
DATED : July 30, 2024
INVENTOR(S) : Cai et al.

Page 1 of 1

It is certified that error appears in the above-identified patent and that said Letters Patent is hereby corrected as shown below:

On the Title Page

Page 2, item (56) References Cited, Foreign Patent Documents, Left-Hand Column, Line 19: reads as "IN 107852310 A 3/2018" should read -- CN 107852310 A 3/2018 --.

Signed and Sealed this
Sixth Day of May, 2025

Coke Morgan Stewart
*Acting Director of the United States Patent and Trademark Office*